(12) United States Patent
Miyata

(10) Patent No.: US 9,400,798 B2
(45) Date of Patent: Jul. 26, 2016

(54) INFORMATION PROCESSING DEVICES THAT MERGE FILES, INFORMATION PROCESSING METHODS FOR MERGING FILES, AND COMPUTER-READABLE MEDIA STORING INSTRUCTIONS THAT INSTRUCT INFORMATION PROCESSING DEVICES TO MERGE FILES

(71) Applicant: Yuji Miyata, Kitanagoya (JP)

(72) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 423 days.

(21) Appl. No.: 13/848,013

(22) Filed: Mar. 20, 2013

(65) Prior Publication Data

US 2013/0262413 A1 Oct. 3, 2013

(30) Foreign Application Priority Data

Mar. 30, 2012 (JP) .................................. 2012-082549

(51) Int. Cl.
*G06F 7/00* (2006.01)
*G06F 17/30* (2006.01)
(Continued)

(52) U.S. Cl.
CPC ............ *G06F 17/3015* (2013.01); *G06F 3/033* (2013.01); *G06F 17/30115* (2013.01)

(58) Field of Classification Search
CPC ................ G06F 1/1637; G06F 1/1647; G06F 2200/1637; G06F 3/14; G06F 3/1454; G06F 17/00; G06F 17/30; G06F 17/30011; G06F 17/30994; G06F 17/30067; G06F 17/30126; G06F 17/30277; G06F 17/3028; G06F 17/30997

USPC ................ 455/41.1, 41.2, 41.3; 707/999.107, 707/E17.008, 999.007, 999.2, E17.01, 707/E17.012, E17.014, E17.031, E17.046, 707/E17.143

See application file for complete search history.

(56) References Cited

U.S. PATENT DOCUMENTS 8,898,567 B2 11/2014 Arrasvuori et al.
2008/0144066 A1 6/2008 Ferlitsch
(Continued)

FOREIGN PATENT DOCUMENTS

JP 2008-109644 A 5/2008

OTHER PUBLICATIONS

United States Patent and Trademark Office; Non-Final Office Action issued for related co-pending U.S. Appl. No. 13/848,003, mailed Oct. 22, 2015.

(Continued)

*Primary Examiner* — Usmaan Saeed
*Assistant Examiner* — Cecile Vo
(74) *Attorney, Agent, or Firm* — Baker Botts L.L.P.

(57) ABSTRACT

An information processing devices transmits a request including identifying information that identifies the information processing device. The information processing device receives a first file and first location information that represents a location of a first terminal device. The information processing device receives a second file and second location information that represents a location of a second terminal device. The information processing device determines a positional relationship between the first and second terminal devices based on the first and second location information. The information processing device merges the first and second files in an arrangement based on the positional relationship between the first and second terminal devices. Some information processing devices receive a first file request and particular identifying information identifying a particular terminal device. The information processing devices transmit a second file request and a particular response including a particular file in response to receiving the first file request.

22 Claims, 12 Drawing Sheets

(51) Int. Cl.
*G06F 3/033* (2013.01)
*G06F 13/14* (2006.01)

(56) References Cited

U.S. PATENT DOCUMENTS

2010/0130125 A1* 5/2010 Nurmi ................ H04M 1/7253
455/41.1
2012/0220221 A1* 8/2012 Moosavi ......... H04M 1/274516
455/41.1
2013/0052954 A1* 2/2013 Avadhanam .......... H04W 4/008
455/41.2
2013/0262526 A1* 10/2013 Miyata .............. G06F 17/30115
707/803

OTHER PUBLICATIONS

United States Patent and Trademark Office; Final Office Action issued for related co-pending U.S. Appl. No. 13/848,003, mailed May 31, 2016.

* cited by examiner

Fig.2B

| ORDER | FILE NAME | LOCATION INFORMATION | UP/DOWN ORIENTATION INFORMATION | DIRECTION INFORMATION |
|---|---|---|---|---|
| 1 | F A | EAST LONGITUDE:0 NORTH LATITUDE:20.0000000 | UP | NORTH |
| 2 | F B | EAST LONGITUDE:0 NORTH LATITUDE:20.0000001 | UP | SOUTH |
| 3 | F C | EAST LONGITUDE:0 NORTH LATITUDE:20.0000002 | DOWN | NORTH |
| 4 | F D | EAST LONGITUDE:0 NORTH LATITUDE:20.0000003 | UP | NORTH |

13a1 — ORDER
13a2 — FILE NAME
13a3 — LOCATION INFORMATION
13a4 — UP/DOWN ORIENTATION INFORMATION
13a5 — DIRECTION INFORMATION
13a

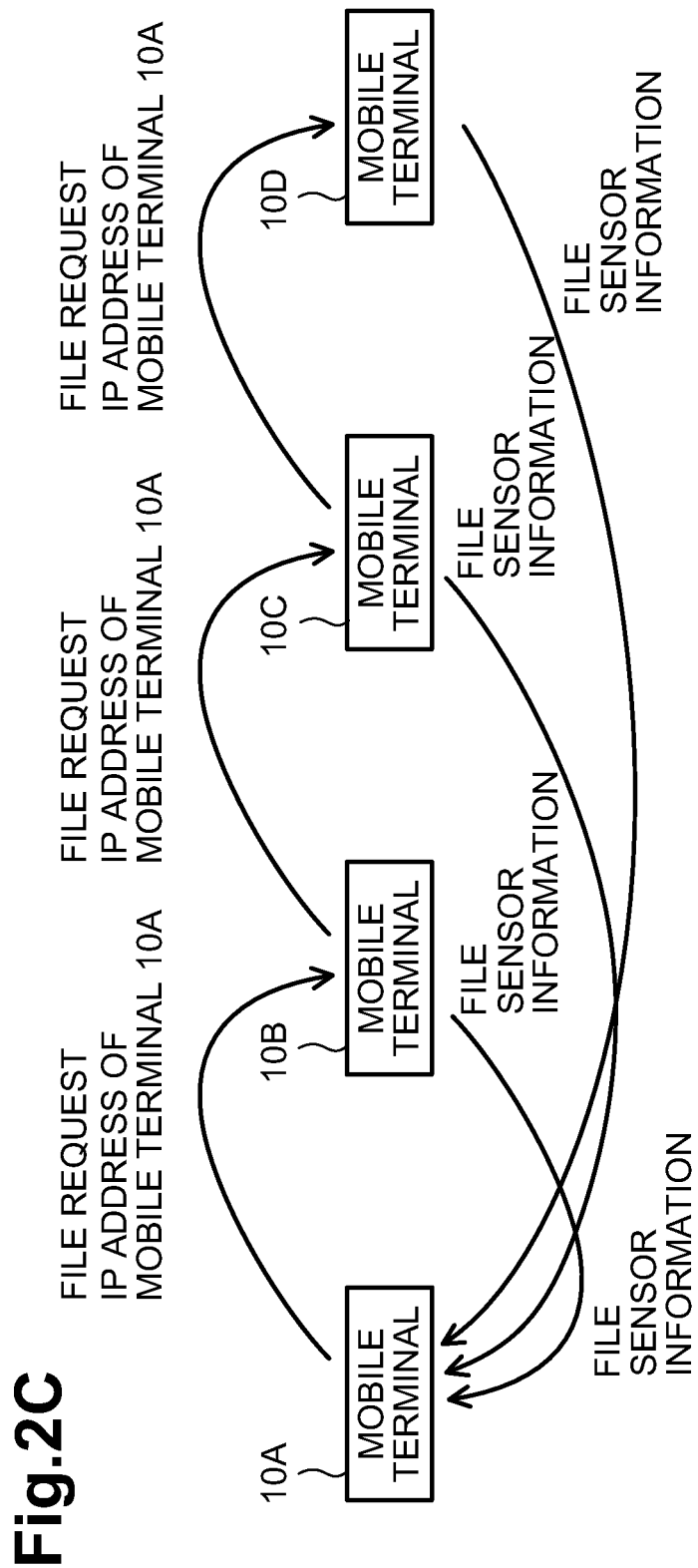

(PROCESS PERFORMED IN MOBILE TERMINAL)

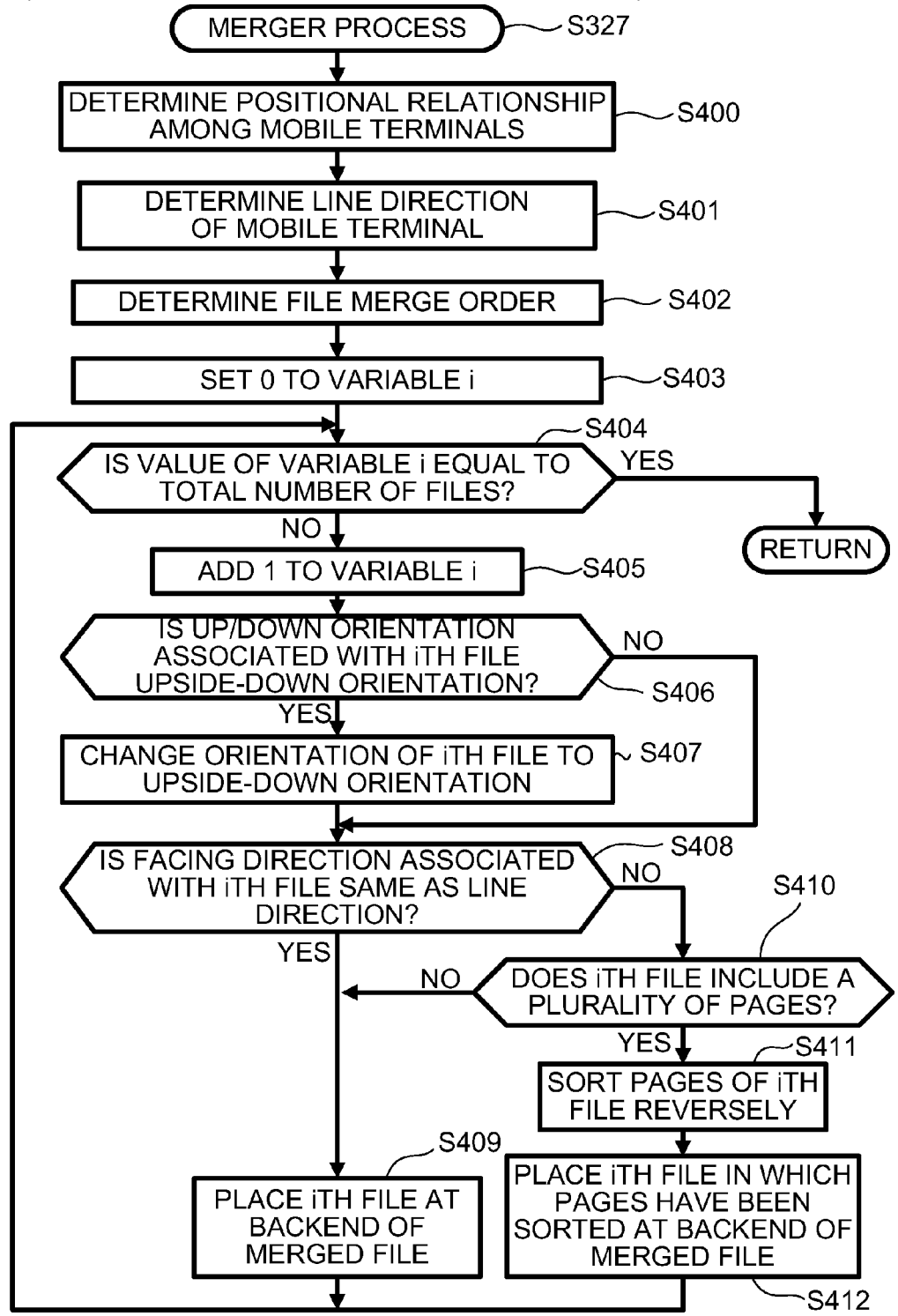

INFORMATION PROCESSING DEVICES THAT MERGE FILES, INFORMATION PROCESSING METHODS FOR MERGING FILES, AND COMPUTER-READABLE MEDIA STORING INSTRUCTIONS THAT INSTRUCT INFORMATION PROCESSING DEVICES TO MERGE FILES

CROSS-REFERENCE TO RELATED APPLICATION

This application claims priority from Japanese Patent Application No. 2012-082549, filed on Mar. 30, 2012, the disclosure of which is incorporated herein by reference.

BACKGROUND OF THE INVENTION

1. Field of the Invention

The disclosure relates generally to information processing and more specifically to information processing devices that merge files, information processing methods for merging files, and computer-readable media storing instructions that instruct information processing devices to merge files.

2. Description of Related Art

A known multifunction peripheral receives a plurality of files and merges the plurality of received files into a single multi-page file.

SUMMARY OF THE INVENTION

A multifunction peripheral may be configured to merge merge-target files into a single file according to a specified file merge order. In particular configurations, the file merge order may be specified by an input signal, which may, for example, be provided to the multifunction peripheral by a user or another device. For example, the file merge order may be specified in advance via input of a particular file merge order through a control panel of the multifunction peripheral. Nevertheless, the specification of the file merge order may be complicated, and thus, a wrong file merge order may be specified.

Accordingly, certain aspects of the disclosure have been developed in view of the problems described above as well as other problems. Configurations disclosed herein may provide for computer-readable storage media storing computer-readable instructions for information processing, methods for information processing, and mobile terminals for information processing. Such information processing may comprise a process for readily merging a plurality of files.

Computer readable media disclosed herein may store computer-readable instructions therein. The computer-readable instructions may instruct an information processing device to perform certain steps when executed by the information processing device. The information processing device may communicate with a plurality of terminal devices. The instructions may instruct the information processing device to transmit a request including identifying information. The identifying information may identify the information processing device. The instructions may instruct the information processing device to receive a first file and first location information from a first terminal device. The first location information may represent a location of the first terminal device. The instructions may instruct the information processing device to receive a second file and second location information from a second terminal device. The second location information may represent a location of the second terminal device. The instructions may instruct the information processing device to determine a positional relationship between the first terminal device and the second terminal device based on the first location information and the second location information. The instructions may instruct the information processing device to merge the first file and the second file in an arrangement based on the positional relationship between the first terminal device and the second terminal device.

Computer readable media disclosed herein may store computer-readable instructions therein. The computer-readable instructions may instruct an information processing device to perform certain steps when executed by the information processing device. The information processing device may communicate with a plurality of terminal devices. The instructions may instruct the information processing device to receive a first file request and particular identifying information from a particular terminal device. The particular identifying information may identify the particular terminal device. The instructions may instruct the information processing device to transmit a second file request in response to receiving the first file request. The instructions may instruct the information processing device to transmit a particular response in response to receiving the first file request. The particular response may include a particular file.

An information processing device disclosed herein may communicate with a plurality of terminal devices. The information processing device may include a communication device, a processor, and a memory. The communication device may communicate with at least one of the plurality of terminal devices. The memory may store computer-readable instructions therein. The computer-readable instructions may instruct the information processing device to perform certain steps when executed by the information processing device. The instructions may instruct the information processing device to transmit a request including identifying information. The identifying information may identify the information processing device. The instructions may instruct the information processing device to receive a first file and first location information from a first terminal device. The first location information may represent a location of the first terminal device. The instructions may instruct the information processing device to receive a second file and second location information from a second terminal device. The second location information may represent a location of the second terminal device. The instructions may instruct the information processing device to determine a positional relationship between the first terminal device and the second terminal device based on the first location information and the second location information. The instructions may instruct the information processing device to merge the first file and the second file in an arrangement based on the positional relationship between the first terminal device and the second terminal device.

An information processing device disclosed herein may communicate with a plurality of terminal devices. The information processing device may include a communication device, a processor, and a memory. The communication device may communicate with at least one of the plurality of terminal devices. The memory may store computer-readable instructions therein. The instructions may instruct the information processing device to receive a first file request and particular identifying information from a particular terminal device. The particular identifying information may identify the particular terminal device. The instructions may instruct the information processing device to transmit a second file request in response to receiving the first file request. The instructions may instruct the information processing device to transmit a particular response in response to receiving the first file request. The particular response may include a particular file.

The aspects of the disclosure may be configured in various manners and as various devices, such as, for example, one or more of an information processing system, an information processing method, and a computer-readable storage medium storing computer-readable instructions for information processing. In certain configurations, an information processing system may comprise, for example, one or more of an information processing device, a mobile terminal, and a control device configured to control the information processing device.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 2B shows an example of information stored in a file information table corresponding to the example arrangement of FIG. 2A.

FIG. 2C is a schematic diagram showing a communication process performed by each mobile terminal when executing the file merger application according to particular configurations.

FIG. 4 is a flowchart showing an example merger process according to particular configurations.

DETAILED DESCRIPTION OF EMBODIMENTS OF THE INVENTION

Figure 1A:
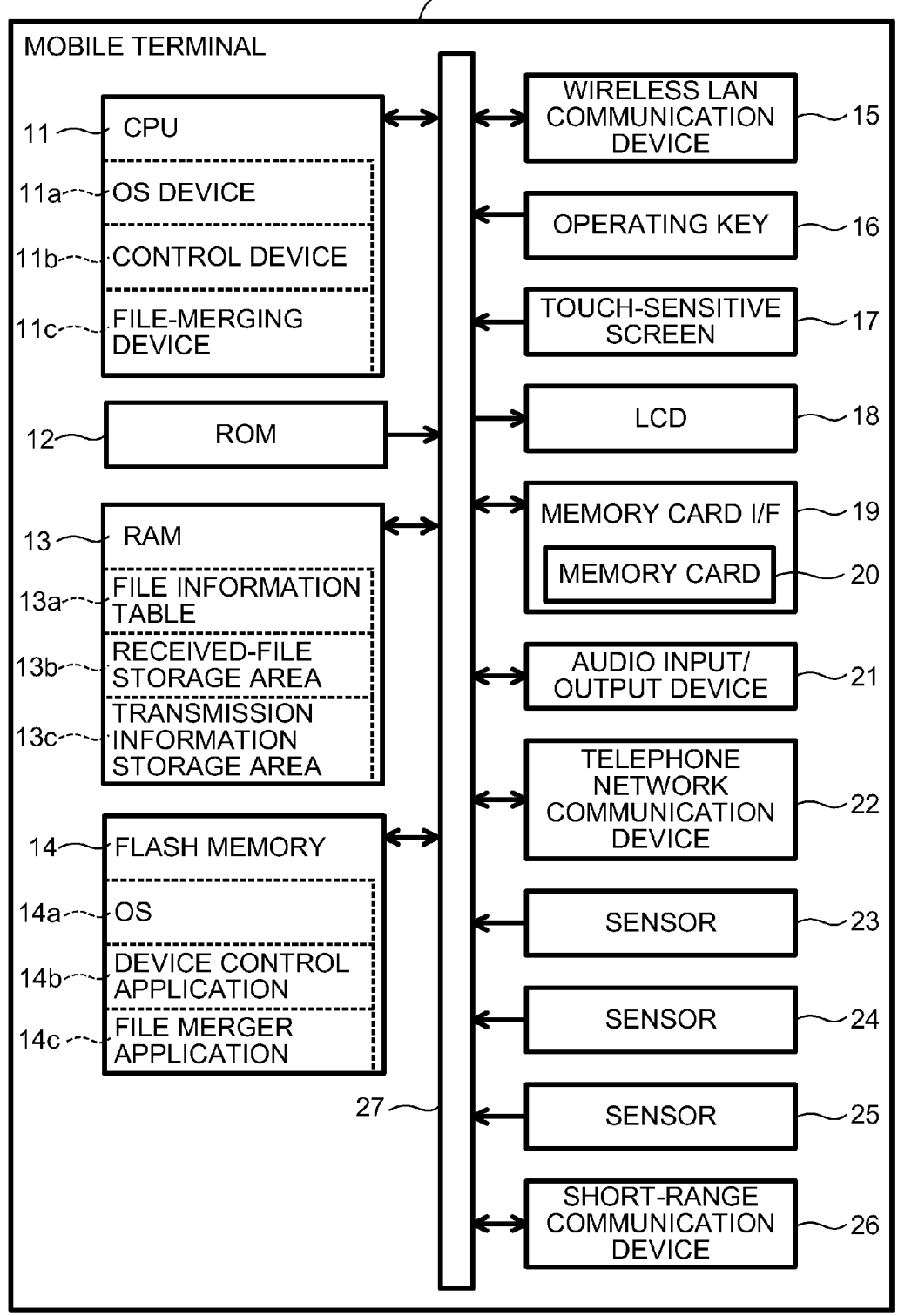
FIG. 1A is a block diagram showing an electrical configuration of a mobile terminal according to particular configurations.

With reference to FIGS. 1-5, particular configurations according to one or more aspects of the disclosure now are described. FIG. 1A is a block diagram showing an electrical configuration of a mobile terminal 10 on which a file merger application 14c (e.g., computer-readable instructions that instruct a processor to merged files) is installed. The mobile terminal 10 may function as one or more of a main terminal and a sub-terminal in accordance with processing performed by a central processing unit ("CPU") 11 according to the file merger application 14c. The mobile terminal 10 functioning as the main terminal may be configured to merge a file provided by the main terminal itself and one or more files received from one or more mobile terminals 10 functioning as sub-terminals. In particular configurations, the merge-target files may be in the same format. The mobile terminal 10 functioning as the main terminal may be configured to change file merge conditions in accordance with a positional relationship between the main terminal itself and each of the sub-terminals. Therefore, the merging of the plurality of files using the plurality of mobile terminals 10 may be easy and intuitive.

The mobile terminal 10 may comprise, for example, one or more of the CPU 11, a read-only memory ("ROM") 12, a random-access memory ("RAM") 13, a flash memory 14, a wireless local area network ("LAN") communication device 15, an operation key 16, a touch-sensitive screen 17, a liquid crystal display ("LCD") 18, a memory card interface ("I/F") 19 with a memory card 20 connected thereto, an audio input/output device 21, a telephone network communication device 22, a sensor 23, a sensor 24, a sensor 25, and a short-range communication device 26, each of which may be connected together via a bus 27. The ROM 12, the RAM 13, the flash memory 14, and memory card 20 may be examples of memories and computer-readable storage media. Such computer-readable storage media and memories may further comprise other non-transitory, computer-readable media.

The CPU 11 may be configured to control each device connected to the bus 27 in accordance with fixed values and computer-readable instructions stored in the ROM 12. The ROM 12 may be a non-rewritable nonvolatile memory. The RAM 13 may be a rewritable volatile memory. The RAM 13 may comprise a file information table 13a, a received-file storage area 13b, and a transmission information storage area 13c. The file information table 13a and the received-file storage area 13b may be used when the mobile terminal 10 functions as the main terminal. The transmission information storage area 13c may be used when the mobile terminal 10 functions as the sub-terminal. The file information table 13a may store a merge-target file provided by the mobile terminal 10 itself when the mobile terminal 10 is functioning as the main terminal and one or more merge-target files received from one or more other mobile terminals 10 functioning as the sub-terminals. The file information table 13a may store sensor information detected by the sensors 23, 24, and 25 of the mobile terminal 10 functioning as the main terminal and sensor information received from the one or more other mobile terminals 10 functioning as the sub-terminals. The sensor information may comprise location information representing a location of a mobile terminal 10, up/down orientation information (e.g., operational orientation information) representing an up/down orientation (e.g., an operational orientation) of the mobile terminal 10, and direction information representing a facing direction of the mobile terminal 10. The received-file storage area 13b may be configured to store therein a file received from a sub-terminal. The transmission information storage area 13c may be configured to store therein information representing whether a mobile terminal 10 functioning as a sub-terminal has transmitted a file request. In particular configurations, a transmission completion flag may be set in the transmission information storage area 13c. The transmission completion flag may be set to "off" when the file merger application 14c starts. Subsequently, the transmission completion flag may be changed to "on" in response to the mobile terminal 10 transmitting a file request.

The flash memory 14 may be a rewritable nonvolatile memory. The flash memory 14 may be configured to store an operating system ("OS") 14a (e.g., computer-readable instructions for a processor to perform operating functions), a device control application 14b (e.g., computer-readable instructions for a processor to control a device), and a file merger application 14c (e.g., computer-readable instructions for a processor to merged files). In particular configurations, the CPU 11 may execute various computer-readable instructions, such as, for example, one or more of those computer-readable instructions provided in one or more of the applications 14b and 14c and the operating system 14a. Accordingly, CPU 11 may function as, for example, one or more of an OS device 11a, a control device 11b, and a file merging device 11c when executing the computer-readable instructions of the OS 14a, the device control application 14b, and the file merger application 14c, respectively. The OS 14a may comprise computer-readable instructions for implementing standard functions of the mobile terminal 10. In particular configurations, the OS 14a may be, for example, one or more of the Android™ mobile technology platform (Android™ is a trademark owned by Google Inc. of Mountain View, Calif.), the iOS® mobile operating system (iOS® is a registered trademark owned by Cisco Technology, Inc. of San Jose, Calif.), the Windows Mobile® mobile technology platform (Windows Mobile® is a registered trademark of Microsoft Corporation of Redmond, Wash.), and the BlackBerry® communication software (BlackBerry® is a registered trademark of BlackBerry Limited of Ontario, Canada). Nevertheless, the OS 14a is not limited to the above-described systems and may comprise other systems.

The device control application 14b may be supplied by a vendor of a device and installed on the mobile terminal 10. The device control application 14b may enable the mobile terminal 10 to use the device. For example, the device control application 14b may enable the mobile terminal 10 to directly control and use a scanning function of the device without the need for a personal computer.

The file merger application 14c (hereinafter, referred to as "application 14c") may enable the mobile terminal 10 to function as one or more of the main terminal and the sub-terminal (e.g., a specified role). When the mobile terminal 10 functions as the main terminal, the application 14c may instruct the CPU 11 to merge a file provided by the main terminal and one or more files received from one or more other mobile terminals 10 functioning as the sub-terminals. Each process shown in FIGS. 3-5 may be performed by the CPU 11 in accordance with the application 14c.

The wireless LAN communication device 15 may, for example, be a circuit that may enable the mobile terminal 10 to connect with another device via a Wireless Fidelity ("Wi-Fi®") system (Wi-Fi® is a registered certification mark owned by the Wi-Fi Alliance of Austin, Tex.) using, for example, a wireless LAN that complies with the 802.11b/g standard defined by the Institute of Electrical and Electronics Engineers ("IEEE"). The mobile terminal 10 according to particular configurations may be configured to perform wireless communication with another device (not shown), such as, for example, a scanner or another mobile terminal 10, in an infrastructure mode, via an access point (not shown) that may be a relay station. The application 14c may instruct the CPU 11 to implement transmission and reception of files and sensor information between the main terminal and the one or more sub-terminals by wireless communication.

The operation key 16 may be a mechanical key that may permit instructions to be input into the mobile terminal 10. For example, the operation key 16 may be disposed on a housing 101 of the mobile terminal 10. A merge-target file may be specified by operating the operation key 16. The touch-sensitive screen 17 may be disposed over or integrally with the LCD 18 and may allow setting information and instructions to be input into the mobile terminal 10. The LCD 18 may be configured to display various images thereon. A nonvolatile memory card 20 may be attached to the memory card I/F 19. The memory card I/F 19 may be configured to control the reading and writing of data from and to the memory card 20. For example, the memory card 20 may be configured to store a file generated from scanned data obtained from a device (not shown). The audio input/output device 21 may be a device for audio input/output and may comprise, for example, one or more of a microphone and a speaker. The telephone network communication device 22 may be a circuit that may permit a telephone call to be placed via cellular networks (not shown).

The sensor 23 may be configured to detect a location of a mobile terminal 10 as the location information. The sensor 23 may be, for example, a Global Positioning System ("GPS") sensor or another type of sensor. GPS may be a system for detecting the latitude and longitude of a person or thing by using satellites. The GPS sensor may be configured to detect the latitude and longitude of a mobile terminal 10 using the GPS as the location information.

The sensor 24 may be configured to detect an up/down orientation of the mobile terminal 10 (described in more detail below) as the up/down orientation information. In particular configurations, the up/down orientation of the mobile terminal 10 may be defined with respect to a direction of gravity (e.g., a normal orientation with respect to the direction of gravity and an upside-down orientation with respect to the direction of gravity, which is substantially opposite the normal orientation). The up-down orientation of each mobile terminal 10 may be determined independently. The sensor 24 may be, for example, a gyro sensor. When the sensor 24 is a gyro sensor, the sensor 24 may detect angular velocity of the mobile terminal 10 to detect the up/down orientation of the mobile terminal 10. In some configurations, the sensor 24 may be a sensor other than a gyro sensor. As disclosed herein, and with reference to the mobile terminal 10 shown in FIG. 1C, a "substantially normal orientation" may be an orientation in which a side of the mobile terminal 10 comprising operation key 16 is furthest downstream in a direction of gravity among the sides of the mobile terminal 10.

The sensor 25 may be configured to detect a direction that the mobile terminal 10 faces as the direction information. The sensor 25 may be, for example, a direction sensor. When the sensor 25 is a direction sensor, the sensor 25 may detect a facing direction (described in more detail below, with reference to the drawings) of a surface of the mobile terminal 10 that may be disposed in a substantially vertical position. The direction sensor may comprise, for example, a micro magnetic sensor using the Magneto-Impedance ("MI") effect of a magnetic substance having soft magnetic properties, such as an MI sensor. In some configurations, the sensor 25 may, for example, be a sensor other than an MI sensor.

The short-range communication device 26 may comprise a circuit configured to perform short-range communication with another device. Such short-range communication may have a short communicable range, such as, for example, approximately 10 cm. A contactless communication system, such as a system based on Near Field Communication ("NFC") standards, may be adopted for the short-range communication. The mobile terminal 10 may be configured to perform short-range communication with another mobile terminal 10. When executed by the CPU 11, the application 14c may implement the transmission and reception of a file request and an IP address among the main terminal and the one or more sub-terminals via short-range communication. Thus, in particular configurations, a mobile terminal 10 may receive a file request and an IP address from another mobile terminal 10 via short-range communication when a distance between the mobile terminal 10 and the other mobile terminal 10 becomes less than or equal to a communicable distance.

Figure 1B:
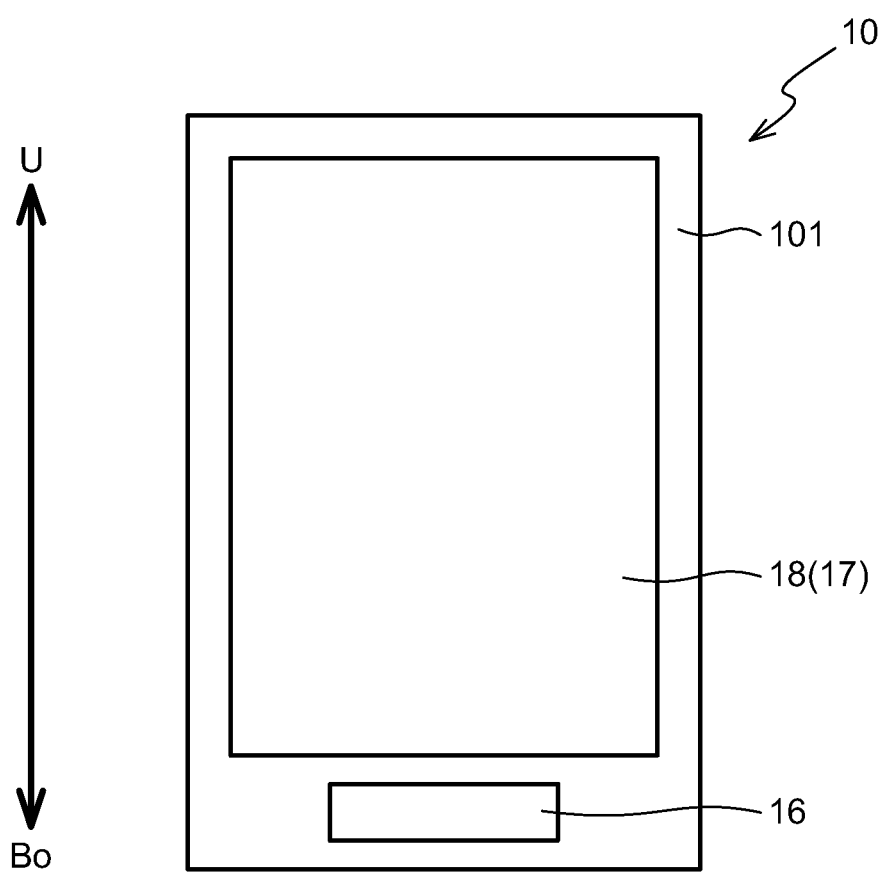
FIG. 1B is a front view showing the mobile terminal according to particular configurations.

FIG. 1B is a front view showing the mobile terminal 10. As shown in FIG. 1B, the mobile terminal 10 may comprise a substantially box-shaped housing 101. The housing 101 may comprise, for example, one or more of the touch-sensitive screen 17, the liquid crystal display ("LCD") 18, and the operation key 16 on one surface thereof. The LCD 18, which may incorporate, overlay, or underlay the touch-sensitive screen 17, and the operation key 16 may be disposed side by side along a longitudinal direction of the housing 101 (e.g., an up or down direction in FIG. 1B that is indicated by a double-ended arrow). In particular configurations, the up/down orientation of the mobile terminal 10 may be defined with respect to the direction of gravity. A normal orientation of the mobile terminal 10 may be an orientation in which the mobile terminal 10 is intended to be used normally. The mobile terminal 10 may be used normally while the LCD 18 is situated at an upper portion of the mobile terminal 10 and the operation key 16 may be situated at a lower portion of the mobile terminal 10, as shown in FIG. 1B. Therefore, the mobile terminal 10 shown in FIG. 1B may be in the normal orientation because, in FIG. 1B, the LCD 18 is situated at the upper portion of the mobile terminal 10 (e.g., an upper side to which an arrow U may point) and the operation key 16 is situated at the lower portion of the mobile terminal 10 (e.g., a lower side to which an arrow Bo may point). An upside-down orientation of the mobile terminal 10 may be an orientation in which the mobile terminal 10 shown in FIG. 1B is rotated by a half-turn (e.g., substantially 180 degrees) about an axis normal to the surface of the LCD 18. In the upside-down orientation, the LCD 18 may be situated at the lower portion of the mobile terminal 10 (e.g., a lower side to which the arrow Bo may point) and the operation key 16 may be situated at the upper portion of the mobile terminal 10 (e.g., an upper side to which the arrow U may point). The sensor 24 may be configured to detect the up/down orientation of the mobile terminal 10 regardless of whether the mobile terminal 10 is in the normal orientation or in the upside-down orientation. In particular configurations, the application 14c may be configured to change an up/down orientation of one or more pages comprised in each merge-target file in accordance with the up/down orientation of each of a receiver mobile terminal 10 and a sender mobile terminal 10.

Figure 1C:
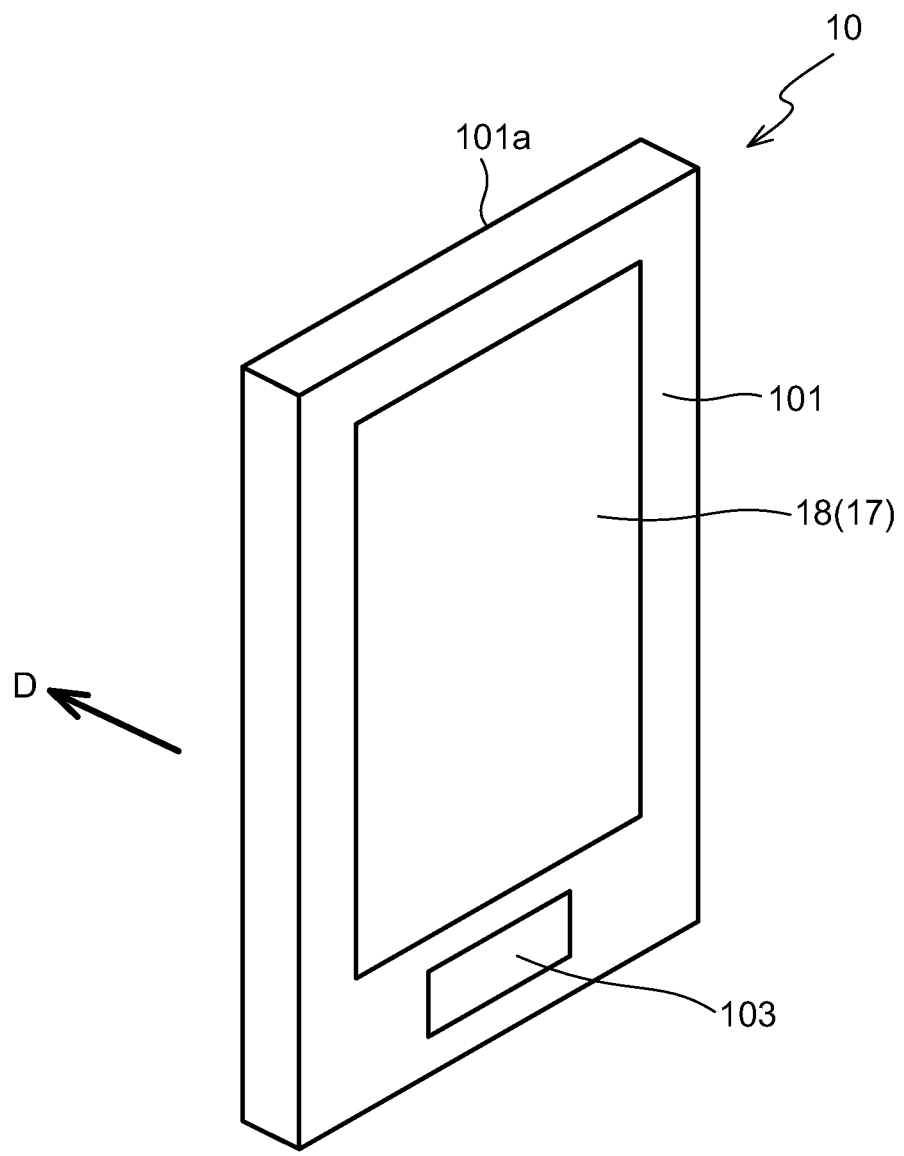
FIG. 1C is a perspective view of the mobile terminal according to particular configurations.

FIG. 1C is a perspective view showing the mobile terminal 10. As shown in FIG. 1C, the mobile terminal 10 may comprise a rear surface 101a that may be opposite to the surface on which the LCD 18 is disposed (the surface on which the LCD 18 is disposed in FIG. 1C, hereinafter, also referred to as a "reference surface"). The sensor 25 may be configured to detect a direction of a vector normal to the reference surface and extending toward the rear surface 101a from the reference surface (e.g., a direction of an arrow D in FIG. 1C) that may correspond to the facing direction of the mobile terminal 10.

Figure 2A:
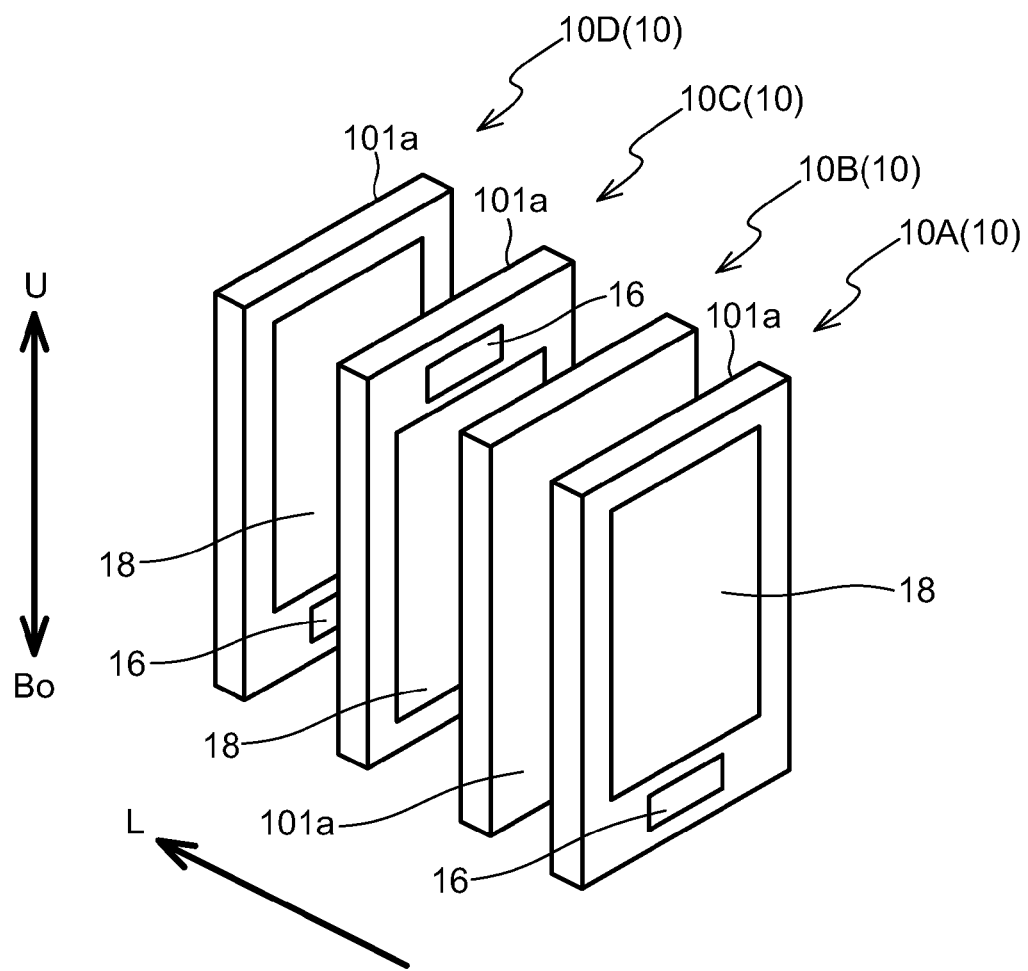
FIG. 2A is a schematic diagram showing an example arrangement of a plurality of mobile terminals during a file merger process performed when executing a file merger application according to particular configurations.

FIG. 2A is a schematic diagram showing an example arrangement of a plurality of mobile terminals 10 during a file merge process implemented by the application 14c. Nevertheless, the example arrangement in FIG. 2A is merely an example, and other possible arrangements of the plurality of mobile terminals 10 are contemplated hereby. The file merge process may be implemented by the application 14c in response to a plurality of mobile terminals 10 being arranged in a line so as to substantially overlap one another. One or more of the mobile terminals of the plurality of mobile terminals 10 may be in contact with or spaced apart from one or more other mobile terminals of the plurality of mobile terminals. In particular configurations, for example, only one mobile terminal 10 representing a main terminal may be configured to perform short-range communication with each of the other mobile terminals 10 representing sub-terminals, such that a receiving order of files received from a plurality of sub-terminals may be controlled. Nevertheless, in other configurations, one or more of the other terminals 10 may perform short-range communication with one or more other terminals 10 of the other terminals 10 representing the sub-terminals and the mobile terminal representing the main terminal. In the example arrangement shown in FIG. 2A, four mobile terminals 10 (e.g., mobile terminals 10A-10D) may be arranged in line. In particular configurations, a file merge process implemented by the application 14c may be performed by a mobile terminal 10 functioning as the main terminal and at least one mobile terminal 10 functioning as the sub-terminal. Thus, the number of mobile terminals 10 to be arranged in line may be increased or reduced appropriately in accordance with the number of files to be merged.

To merge files into a single file, for example, one mobile terminal 10 of a plurality of mobile terminals 10 may function as a main terminal and at least one other mobile terminal 10 of the plurality of mobile terminals 10 may function as a sub-terminal, respectively. Hereinafter, a mobile terminal 10 functioning as the main terminal may also be referred to as a "main terminal 10," and a mobile terminal 10 functioning as the sub-terminal may also be referred to as a "sub-terminal 10." The main terminal 10 may be configured to determine file merge conditions based on a positional relationship among the plurality of mobile terminals 10 (e.g., a positional relationship between the main terminal 10 and the one or more sub-terminals 10 arranged in line therewith) arranged in line, the facing direction of each mobile terminal 10 of the plurality of mobile terminals 10 (e.g., a facing direction with respect to a line extending in a direction of an arrow L in FIG. 2A), and an up/down orientation of each mobile terminal 10 (e.g., an orientation with respect to a direction of gravity). In the example shown in FIG. 2A, four mobile terminals 10 (e.g., a mobile terminal 10A, a mobile terminal 10B, a mobile terminal 10C, and a mobile terminal 10D) may be arranged in the order shown along the direction of the arrow L. In this example, the mobile terminals 10A, 10C, and 10D may face the same direction (e.g., the direction in which the arrow L points). Consequently, in this example, the rear surface 101a of the mobile terminal 10B may face a direction opposite to the direction that the rear surfaces 101a of the mobile terminals 10A, 10C, and 10D may face. In this example, the up/down orientation of the mobile terminals 10A and 10D may be in a normal orientation, as shown by the positional relationship between the LCD 18 and the operation key 16; and the mobile terminal 10C may be in an upside-down orientation, which may be an inverted orientation from the normal orientation. Although it may be difficult to recognize the orientation of the mobile terminal 10B in FIG. 2A, the orientation of the mobile terminal 10B may be in the normal orientation. Nevertheless, the respective orientations of the mobile terminals 10A, 10B, 10C, and 10D shown in FIG. 2A are merely exemplary, and all possible orientations of the mobile terminals 10A, 10B, 10C, and 10D and other mobile terminals 10 are contemplated herein.

FIG. 2B shows file information stored in the file information table 13a subsequent to determining a file merger order in S402 of FIG. 4 (described below). In particular configurations, the file information table 13a may be stored in the RAM 13 of the main terminal 10, for example. In some configurations, the file information table 13a may be stored in the RAM 13 of one or more sub-terminals 10. In particular, FIG. 2B shows the file information table 13a storing file information that may correspond to the plurality of mobile terminals 10 arranged as shown in FIG. 2A. For each mobile terminal 10 of the plurality of mobile terminals 10, the file information table 13a may store a file name 13a2 of a file on the each mobile terminal 10, location information 13a3 representing a location (e.g., GPS coordinates) of the each mobile terminal 10, up/down orientation information 13a4 representing an up/down orientation of the each mobile terminal 10, and direction information 13a5 representing a facing direction of the each mobile terminal 10 in association with an order 13a1 that may identify an order that the file may be merged. More specifically, according to the example shown in FIG. 2B, for example, "FA," "FB," "FC," and "FD" may be stored as the file names 13a2 corresponding to orders 13a1 of "1," "2," "3," and "4," respectively. The file names "FA," "FB," "FC," and "FD," for example, may correspond to file names of files provided by the mobile terminals 10A, 10B, 10C, and 10D, respectively. The information (e.g., the location information 13a3, the up/down orientation information 13a4, and the direction information 13a5) detected by the sensors 23, 24, and 25 disposed in each mobile terminal 10 (e.g., the mobile terminals 10A, 10B, 10C, and 10D) that provides a corresponding file (e.g., the files corresponding to file names "FA," "FB," "FC," and "FD") may be stored as the respective information 13a3, 13a4, and 13a5 in association with each file name 13a2.

In FIG. 2B, "east longitude: 0, north latitude: 20.0000000," "east longitude: 0, north latitude: 20.0000001," "east longitude: 0, north latitude: 20.0000002," and "east longitude: 0, north latitude: 20.0000003" may be stored as the location information 13a3 in association with the file names "FA," "FB," "FC," and "FD," respectively. According to the example of FIG. 2B, the location information 13a3 may represent that the mobile terminals 10A, 10B, 10C, and 10D are arranged in a north-south direction, with the mobile terminal 10A being located at the southernmost position among the mobile terminals 10A, 10B, 10C, and 10D and the mobile terminal 10D being located at the northernmost position among the mobile terminals 10A, 10B, 10C, and 10D. In particular configurations, such as the example of FIGS. 2A and 2B, for example, the mobile terminal 10A may be located at the front of the line. In FIG. 2A, the direction of the arrow L may represent, for example, a northward direction, such that the line of the mobile terminals 10 may extend in the northward direction. Further, "up," "up," "down," and "up" may be stored as the up/down orientation information 13a4 in association with the file names "FA," "FB," "FC," and "FD," respectively. The up/down orientation information 13a4 may represent that the mobile terminals 10A, 10B, and 10D are in the normal orientation and the mobile terminal 10C is in the upside-down orientation. Furthermore, "north," "south," "north," and "north" may be stored as the direction information 13a5 (e.g., facing direction information) in association with the file names "FA," "FB," "FC," and "FD," respectively. The direction information 13a5 may represent that the mobile terminals 10A, 10C, and 10D face in the northward direction and the mobile terminal 10B faces in a southward direction opposite to the northward direction.

With reference to FIG. 2C, communication performed by each mobile terminal 10 in accordance with the application 14c now is described. FIG. 2C shows communication performed by the mobile terminals 10 (e.g., the mobile terminals 10A, 10B, 10C, and 10D), which are arranged as shown in FIG. 2A. In the example of FIGS. 2A-2C, the mobile terminal 10A, for example, may function as the main terminal, and the mobile terminals 10B, 10C, and 10D may function as sub-terminals. Nevertheless, in other configurations, others of the mobile terminals 10A, 10B, 10C, and 10D may function as the main terminal or sub-terminals. The mobile terminal 10A may transmit a file request and its own IP address via short-range communication. The file request and IP address transmitted by the mobile terminal 10A may be received by a mobile terminal 10 that is present within a communicable range of the short-range communication (e.g., the mobile terminal 10B disposed adjacent to the mobile terminal 10A).

In response to receiving the file request and the IP address from the mobile terminal 10A, the mobile terminal 10B may transmit a merge-target file and its own sensor information via wireless communication to an address designated by the received IP address. The received IP address may be the IP address of the mobile terminal 10A. Therefore, the mobile terminal 10A may receive the merge-target file and the sensor information transmitted by the mobile terminal 10B. In particular configurations, for example, the mobile terminal 10B also may transmit the file request and IP address received from the mobile terminal 10A via short-range communication. The file request and IP address of the mobile terminal 10A transmitted by the mobile terminal 10B may be received by another mobile terminal 10 present within the communicable range of short-range communication (e.g., the mobile terminal 10C disposed adjacent to the mobile terminal 10B).

In response to receiving the file request and IP address from the mobile terminal 10B disposed adjacent to the mobile terminal 10C, the mobile terminal 10C may transmit a merge-target file and its own sensor information via wireless communication to the address designated by the received IP address. The received IP address may be the IP address of the mobile terminal 10A. Therefore, the mobile terminal 10A may receive the merge-target file and sensor information transmitted by the mobile terminal 10C. In particular configurations, for example, the mobile terminal 10C also may transmit the file request and IP address received from the mobile terminal 10B via short-range communication. The file request and IP address of the mobile terminal 10A transmitted by the mobile terminal 10C may be received by still another mobile terminal 10 present within the communicable range of short-range communication (e.g., the mobile terminal 10D disposed adjacent to the mobile terminal 10C).

In response to receiving the file request and IP address from the mobile terminal 10C disposed adjacent to the mobile terminal 10D, the mobile terminal 10D may transmit a merge-target file and its own sensor information via wireless communication to the address designated by the received IP address (e.g., the mobile terminal 10A). Therefore, the mobile terminal 10A may receive the merge-target file and sensor information transmitted by the mobile terminal 10D.

Therefore, the files transmitted from each of the sub-terminals 10 (e.g., the mobile terminals 10B, 10C, and 10D) may be compiled in the main terminal 10 (e.g., the mobile terminal 10A). Further, the main terminal 10 may receive the sensor information transmitted from each of the sub-terminals 10. Accordingly, the main terminal 10 may determine file merge conditions based on the sensor information received from each sub-terminal 10 and its own sensor information detected by the sensors 23, 24, and 25, and the main terminal 10 may merge its own merge-target file and the merge-target files received from the respective sub-terminals 10.

Figure 3A:
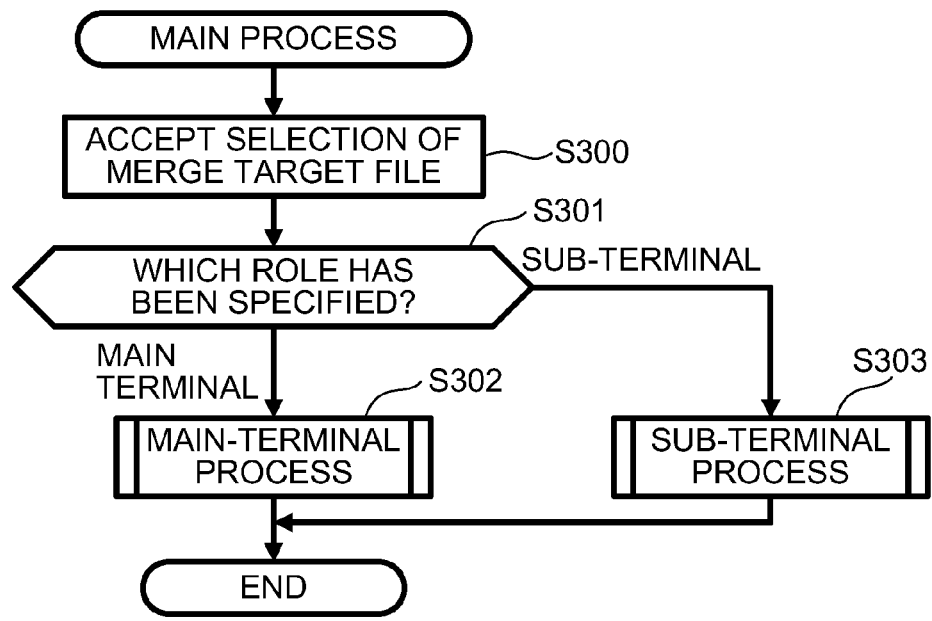
FIG. 3A is a flowchart showing an example main process according to particular configurations.

FIG. 3A is a flowchart showing a main process performed by the CPU 11 of a mobile terminal 10 in accordance with the application 14c. The main process may be started as the application 14c starts. In S300, the CPU 11 may accept a selection of a merge-target file (S300). The processing of S300 may be performed as described below. For example, the CPU 11 may list the file names of the files stored in the memory card 20 on the LCD 18. In response to receiving a selection of one of the file names, such as an input through the touch-sensitive screen 17, for example, the CPU 11 may accept the selection of the one of the file names as a selection of a file corresponding to the selected file name. The routine may move to S301. In S301, the CPU 11 may determine whether the mobile terminal 10 has been specified as one of a main terminal and a sub-terminal (e.g., determining which role, among a role of main terminal and a role of sub-terminal, has been specified) (S301). In particular, as the application 14c starts on a particular mobile terminal 10, a role (e.g., one of the main terminal and the sub-terminal) for the particular mobile terminal 10 may be selected through, for example, a main screen (not shown) displayed on the LCD 18. As the selection of a role is input through, for example, the touch-sensitive screen 17, the CPU 11 may accept the input and perform the determination in S301 based on the accepted input.

In S301, in response to the CPU 11 determining that the role of the mobile terminal 10 is the main terminal (MAIN TERMINAL in S301), the CPU 11 of the mobile terminal 10 may perform a main-terminal process for controlling the mobile terminal 10 to function as the main terminal (S302). Subsequently, the CPU 11 may end the main process. In response to the CPU 11 determining that the role of the mobile terminal is the sub-terminal (SUB-TERMINAL in S301), the CPU 11 of the mobile terminal 10 may perform a sub-terminal process for controlling the mobile terminal 10 to function as the sub-terminal (S303). Subsequently, the CPU 11 may end the main process.

Figure 3B:
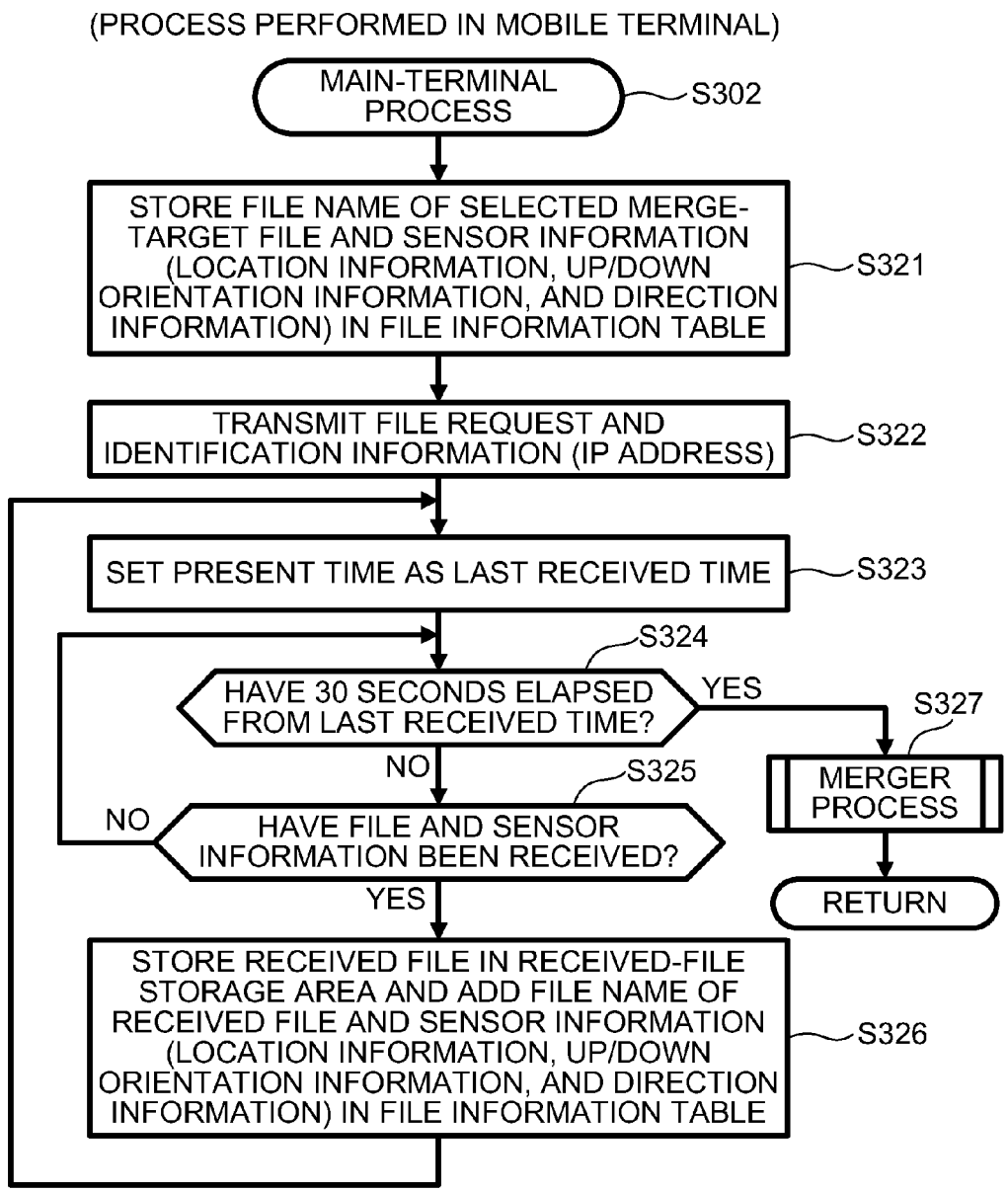
FIG. 3B is a flowchart showing an example main-terminal process according to particular configurations.

With reference to FIG. 3B, the main-terminal process (S302) now is described. In S321, the CPU 11 of the main terminal 10 may store the file name of the merge-target file, which was selected in S300, and sensor information, which was detected by the sensors 23, 24, and 25 of the main terminal 10, in the file information table 13a (S321). Nevertheless, the CPU 11 of the main terminal 10 may, for example, not yet have stored therein a sequence number corresponding to the order 13a1 of the merge-target file from the main terminal 10. In S322, the CPU 11 of the main terminal 10 may transmit a file request and the IP address of the main terminal 10 as identifying information, via the short-range communication device 26, to another mobile terminal 10 (e.g., a sub-terminal 10) (S322).

In S323, the CPU 11 of the main terminal 10 may set the present time, which may, for example, be obtained from a real time clock (not shown) installed on the main terminal 10, as a last received time (S323). In S324, the CPU 11 of the main terminal 10 may determine whether a predetermined period of time (e.g., 30 seconds) has elapsed since the last received time. In response to determining that the predetermined period of time has not elapsed since the last received time (NO in S324), the CPU 11 of the main terminal 10 may proceed to S325 and determine whether one or more of a merge-target file and sensor information have been received in the main terminal 10 (S325). Consequently, in response to determining that the predetermined period of time has not elapsed from the last received time set in the main terminal 10 (NO in S324) and that the wireless LAN communication device 15 of the main terminal 10 has not received a merge-target file and sensor information (NO in S325), the CPU 11 of the main terminal 10 may repeat the processing of S324 and S325 until the predetermined period of time has elapsed from the last received time set in the main terminal 10 (YES in S324) or the wireless LAN communication device 15 of the main terminal 10 receives a merge-target file and sensor information (YES in S325).

In response to determining that the predetermined period of time has not elapsed from the last received time set in the main terminal 10 (NO in S324) and that one or more of the merge-target file and sensor information (e.g., both the merge-target file and the sensor information) have been received in the main terminal 10 (e.g., determining that the wireless LAN communication device 15 of the main terminal 10 has received the merge-target file and the sensor information) (YES in S325), the CPU 11 of the main terminal 10 may proceed to S326 and store the received merge-target file in the received-file storage area 13b and add the file name 13a2 of the received file and the received sensor information 13a3, 13a4, and 13a5 in the file information table 13a (S326). Nevertheless, similar to S321, the CPU 11 of the main terminal 10 may, for example, not yet have stored therein a sequence number corresponding to the order 13a1 of the received merge-target file. Subsequent to S326, the routine may return to S323, and the CPU 11 of the main terminal 10 may update the last received time to the present time. Accordingly, the last received time may be updated each time the main terminal 10 receives a merge-target file and sensor information from a sub-terminal 10. In S324, in response to determining that the predetermined period of time has elapsed from the last received time set in the main terminal 10 (YES in S324), in S327, the CPU 11 of the main terminal 10 may perform a merger process to merge together each of the merge-target files stored in the file information table 13a (S327). Subsequently, the routine may return to the main process of FIG. 3A.

With reference to FIG. 4, the merger process (S327) now is described by referring to the arrangements shown in FIGS. 2A and 2B as an example. In the merger process S327, the CPU 11 of the main terminal 10 may determine a positional relationship among the plurality of mobile terminals 10 based on the location information, which identifies a location of each mobile terminal 10 of the plurality of mobile terminals 10 (e.g., mobile terminals 10A, 10B, 10C, and 10D), stored in the file information table 13a of the main terminal 10 (e.g., the mobile terminal 10A), (S400). For example, the CPU 11 of the main terminal 10 may determine the positional relationship among the mobile terminals 10A, 10B, 10C, and 10D, which correspond to the files with the respective file names "FA," "FB," "FC," and "FD" listed in the file information table 13a as the file names 13a2. Subsequently, the routine may move to S401.

In S401, the CPU 11 of the main terminal 10 may determine a reference direction, which may be a direction in which the line of the mobile terminals 10 extends (S401). In S400, the CPU 11 of the main terminal 10 may determine, based on the location information 13a3, that the mobile terminals 10A, 10B, 10C, and 10D are disposed with the positional relationships shown in FIG. 2A (e.g., the mobile terminals 10A, 10B, 10C, and 10D may be arranged in line from the south to the north). Thus, the line direction of the mobile terminals 10A, 10 B, 10C, and 10D shown in FIG. 2A may be one of a northward direction (from the south to the north) and a southward direction (from the north to the south). In particular configurations, the mobile terminal 10A functioning as the main terminal may be predetermined as the front of the line. Nevertheless, in other configurations, the mobile terminal 10A functioning as the main terminal may be predetermined as another position in the line, such as, for example, the back of the line or another position in the line. Therefore, it may be determined that the line direction of the mobile terminals 10, as shown in FIG. 2A, is the northward direction (e.g., the direction of the arrow L). Subsequently, the routine may move to S402. Nevertheless, in certain arrangements, the mobile terminals 10A, 10B, 10C, and 10D may be arranged in a non-linear fashion. Consequently, a mobile terminal 10 (e.g., mobile terminal 10A) may be determined as a main terminal 10, and the remaining mobile terminals 10 (e.g., mobile terminals 10B, 10C, and 10D) may be determined as sub-terminals 10. Further, the reference direction may be determined as a direction pointing from the main terminal 10 toward a region that comprises each of the sub-terminals 10 and that is on a particular side of the main terminal 10, and such reference direction may be, for example, a direction normal to a reference surface of the main terminal 10 and pointing toward the region that comprises each of the sub-terminals 10.

In S402, the CPU 11 of the main terminal 10 may determine a file merge order. More specifically, the CPU 11 of the main terminal 10 may store, in the file information table 13a of the main terminal 10, sequence numbers corresponding to the order 13a1 of each of the merge-target files stored in the received-file storage area 13b and associated with the file names "FA," "FB," "FC," and "FD." Thus, a sequence number may be obtained for and associated with each file name "FA," "FB," "FC," and "FD" in the file information table 13a, and each sequence number may be based on the positional relationship among the mobile terminals 10A, 10B, 10C, and 10D determined in S400 and the line direction of the mobile terminals 10 determined in S401. Each of the obtained sequence numbers may be stored in the file information table 13a as the order 13a1 associated with a respective file name 13a2 (e.g., each associated with a different one of file names "FA," "FB," "FC," and "FD"). In the example of FIG. 2A, the line direction of the mobile terminals 10 may be the northward direction. Therefore, a sequence number "1" may be assigned to the file name "FA" whose location information 13a3 may represent a southernmost position among the positions of file names "FA," "FB," "FC," and "FD." A sequence number "2" may be assigned to the file name "FB" whose location information 13a3 may represent a position north of the position of file name "FA" but southernmost among the positions of file names "FB," "FC," and "FD." Similarly, a sequence number "3" may be assigned to the file name "FC," and a sequence number "4" may be assigned to the file name "FD." In FIGS. 2A and 2B, the mobile terminals 10 may be arranged in line along the north-south direction without being deviated from the line with respect to the longitudinal direction. Nevertheless, the CPU 11 of the main terminal 10 may, for example, determine the line direction of the mobile terminals 10 by obtaining a linear regression line among the positions of each of the mobile terminals 10 when a position of one or more of the mobile terminals 10 is deviated from the line with respect to the longitudinal direction.

Hereinafter, a file whose file name may correspond to an arbitrary sequence number "i" as the order 13a1 in the file information table 13a may be referred to as an "$i^{th}$ file." In S403, the CPU 11 of the main terminal 10 may initialize a variable i and may set the variable i to an initial value, such as, for example, a value of 0 (zero) (S403). Subsequently, the CPU 11 of the main terminal 10 may perform processing according to one or more of S404-S412 to process each merge-target file in accordance with the up/down orientation information 13a4 and the direction information 13a5 stored in the file information table 13a. In S404, the CPU 11 of the main terminal 10 may determine whether the value of the variable i is equal to a total number of files to be merged (e.g., the number of files stored in the received-file storage area 13b, the number of rows in the file information table 13a) (S404). In response to determining that the value of the variable i is not equal to a total number of files to be merged whose information, such as file name, may be stored in the file information table 13a (NO in S404), the CPU 11 of the main terminal 10 may proceed to S405 add 1 (one) to the variable i (S405). The CPU 11 of the main terminal 10 may proceed to S406 and determine whether the up/down orientation of the mobile terminal 10, from which the $i^{th}$ file of the files stored in the file information table 13a, is the upside-down orientation (S406). More specifically, the CPU 11 may make the determination in S406 based on the up/down orientation of the mobile terminal 10 indicated by the up/down orientation information 13a4 corresponding to the $i^{th}$ file. For example, when a particular mobile terminal 10 is in the normal orientation (e.g., the mobile terminal 10A, 10B, or 10D), the CPU 11 of the main terminal 10 may determine that the up/down orientation of the corresponding file from the particular mobile terminal is the normal orientation. When the particular mobile terminal 10 is in the upside-down orientation (e.g., the mobile terminal 10C), the CPU 11 of the main terminal 10 may determine that the up/down orientation of the corresponding file from the particular mobile terminal 10 is in the upside-down orientation.

For example, in response to determining that the up/down orientation of the mobile terminal 10, from which the $i^{th}$ file was initially transmitted, is the upside-down orientation (YES in S406), the CPU 11 of the main terminal 10 may change (e.g., invert) a page orientation of one or more pages of the $i^{th}$ file to a particular orientation (e.g., an upside-down orientation), and the routine may move to S408. Thus, in the file corresponding to the mobile terminal 10 with an up/down orientation that is the upside-down orientation, one or more pages of the file may be inverted to the upside-down orientation. In response to determining that the up/down orientation of the mobile terminal 10, from which the $i^{th}$ file was initially transmitted, is the normal orientation (NO in S406), the CPU 11 of the main terminal 10 may omit S407, and the routine may move to S408. Consequently, S406 and S407 may enable the up/down orientation of the merge-target files to correspond to the up/down orientation of the mobile terminals 10 that provided such files, respectively.

In S408, the CPU 11 of the main terminal 10 may determine whether the facing direction of the mobile terminal 10, from which the $i^{th}$ file was initially transmitted, is the same as the line direction of the plurality of mobile terminals 10 (S408). More specifically, the CPU 11 may make the determination in S408 based on the direction represented by the direction information corresponding to the $i^{th}$ file and the line direction determined in S401. When the CPU 11 of the main terminal 10 determines that the facing direction of a particular mobile terminal 10 is the same as the line direction (e.g., when the particular mobile terminal 10 is one of the mobile terminals 10A, 10C, and 10D shown in FIG. 2A), the CPU 11 may determine that the facing direction of the corresponding file from the particular mobile terminal 10 is the same as the line direction (YES in S408). When the CPU 11 of the main terminal 10 determines that the facing direction of the particular mobile terminal 10 is different from (e.g., opposite to) the line direction (e.g., when the particular mobile terminal is the mobile terminal 10B shown in FIG. 2A), the CPU 11 may determine that the facing direction of the corresponding file is opposite to the line direction (NO in S408).

In response to determining that the facing direction of the mobile terminal 10, from which the $i^{th}$ file was initially transmitted, is the same as the line direction (YES in S408), the CPU 11 of the main terminal 10 may proceed to S409 and place the $i^{th}$ file behind the $(i-1)^{th}$ file in a merged file comprising the first through $(i-1)^{th}$ files (S409), and the routine may return to S404. In S409, when the variable i equals to 1, the corresponding merge-target file may be placed at the front of the merged file, rather than being placed behind the $(i-1)^{th}$ merge-target file.

In response to determining that the facing direction of the mobile terminal 10, from which the $i^{th}$ file was initially transmitted, is opposite to the line direction (NO in S408), the CPU 11 of the main terminal 10 may proceed to S410 and determine whether the $i^{th}$ file comprises a plurality of pages (S410). In response to determining that the $i^{th}$ file does not comprise a plurality of pages (NO in S410), the CPU 11 of the main terminal 10 may proceed to S409 (described above). In response to determining that the $i^{th}$ file comprises a plurality of pages (YES in S410), the CPU 11 of the main terminal 10 may proceed to S411 and sort the pages of the $i^{th}$ file in reverse (e.g., in descending numeric order) (S411). Subsequent to S411, the CPU 11 of the main terminal 10 may proceed to S412 and place the $i^{th}$ file in which the pages have been sorted in reverse behind the $(i-1)^{th}$ file in the merged file comprising the first through $(i-1)^{th}$ files (S412), and the routine may return to S404. In S412, when the variable i equals to 1, the corresponding merge-target file in which the pages have been sorted in reverse may be placed at the front of the merged file, rather than being placed behind the $(i-1)^{th}$ file. In S404, when the CPU 11 determines that the value of the variable i is the same as the total number of files to be stored in the file information table 13a (YES in S404), the CPU 11 of the main terminal 10 may determine that each of the files stored in the file information table 13a has been merged, and the CPU 11 may end the merger process.

According to the above-described merger process (S327), the merge-target files may be arranged sequentially, such that a merge-target file, which corresponds to a mobile terminal 10 with a location relatively far from the main terminal 10 in the line direction, may be represented by the corresponding location information 13a3 and may be placed toward the rear in the merged file. Thus, the merge-target files may be merged in an order based on the positional relationship among the mobile terminals 10. As described above, the application 14c may determine the file order in accordance with the arrangement order of the plurality of mobile terminals 10. Therefore, the merging of the plurality of files may be intuitive.

The mobile terminal 10 may function similarly to a physical file comprising one or more pages, in which the reference surface (e.g., the surface on which the LCD 18 may be disposed) may correspond to a first page of the file and the rear surface 101a of the mobile terminal 10 correspond to an $n^{th}$ page (e.g., a last page) of the file. Consequently, in a mobile terminal 10 that may face the same direction as the line direction of the mobile terminals 10 (e.g., the mobile terminal 10, such as the mobile terminals 10A, 10C, and 10D shown in FIG. 2A, with the rear surface 101a thereof located closer to the backend of the line of the mobile terminals 10 than the reference surface thereof), the page order of an original file provided by the mobile terminal 10 in the merged file may be in an ascending numeric order. Further, in a mobile terminal 10 that may face a direction substantially opposite to the line direction of the mobile terminals 10 (e.g., the mobile terminal 10, such as the mobile terminal 10B shown in FIG. 2A, with the reference surface thereof located closer to the backend of the line of the mobile terminals 10 than the rear surface 101a thereof), the page order of an original file provided by the mobile terminal 10 in the merged file may be in a descending numeric order. Therefore, when a particular merge-target file is to be merged in reverse page order from the page order of the original file, an appropriate mobile terminal 10 storing the particular merge-target file may be disposed in the line of the mobile terminals 10 to face the direction opposite to the line direction of the mobile terminals 10. Accordingly, the merge-target file may be merged in an appropriate page order. As described above, the application 14c may control the page order of the merge-target file in accordance with the facing direction of each mobile terminal 10. Therefore, the merging of the plurality of files may be intuitive. As disclosed herein, a first direction may be "substantially the same as" a second direction when an angle from the first direction to the second direction is greater than or equal to 0 degrees and less than 90 degrees or greater than 270 degrees and less than 360 degrees. As disclosed herein, a first direction may be "substantially opposite to" a second direction when an angle from the first direction to the second direction is greater than 90 degrees and less than 270 degrees.

When the mobile terminal 10 is in the normal orientation, the mobile terminal 10 may function similarly to the physical file with pages in the normal orientation. When the mobile terminal 10 is in the upside-down orientation, the mobile terminal 10 may function similarly to the physical file with pages in the upside-down orientation. Therefore, when a merge-target file is to be merged with the original file inverted to the upside-down orientation, the mobile terminal 10 may be inverted to the upside-down orientation. By doing so, the merge-target file may be merged in an appropriate up/down orientation. As described above, the application 14c may control the up/down orientation of the merge-target file in accordance with the up/down orientation of each mobile terminal 10. Therefore, the merging of the plurality of files may be intuitive.

Figure 5:
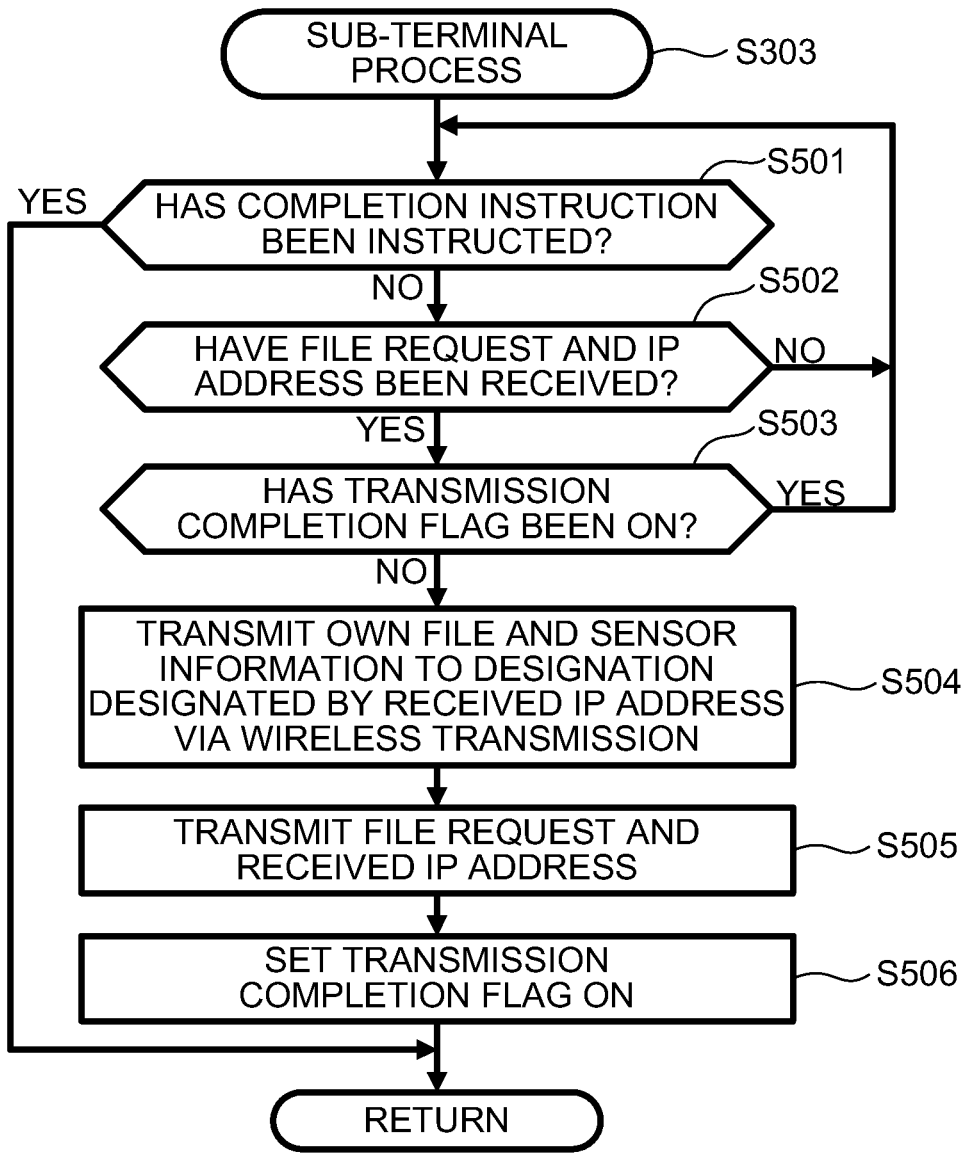
FIG. 5 is a flowchart showing an example sub-terminal process according to particular configurations.

With reference to FIG. 5, the sub-terminal process (S303) now is described. In S501, the CPU 11 of the sub-terminal 10 may determine whether a completion instruction has been instructed (S501). More specifically, for example, the CPU 11 of the sub-terminal 10 may determine whether a completion instruction has been input (e.g., an area corresponding to an icon for a completion instruction displayed on the LCD 18 has been touched and the touch has been accepted through the touch-sensitive screen 17). In response to determining that the completion instruction has been instructed (YES in S501), the CPU 11 of the sub-terminal 10 may end the sub-terminal process. In response to determining that the completion instruction has not been accepted (NO in S501), the CPU 11 of the sub-terminal 10 may perform processing of S502. In S502, the CPU 11 may determine whether a file request and an IP address have been received via the short-range communication device 26 (S502). In response to determining that a file request and an IP address have been received via the short-range communication device 26 (YES in S502), the CPU 11 of the sub-terminal 10 may perform processing of S503. In response to determining that a file request and an IP address have not been received via the short-range communication device 26 (NO in S502), the CPU 11 of the sub-terminal 10 may return to S501. In S503, the CPU 11 of the sub-terminal 10 may determine whether the transmission completion flag has been set to "on" (S503). In response to determining that the transmission completion flag provided in the transmission information storage area 13c has not been set to on (NO in S503), the CPU 11 of the sub-terminal 10 may proceed to S504 and transmit the file accepted as the merge target in S300 and its own sensor information detected by the sensors 23, 24, and 25 of the sub-terminal 10 through wireless communication to the destination designated by the received IP address, via the wireless LAN communication device 15 (S504). In particular configurations, for example, the IP address received by each sub-terminal 10 may be the IP address of the main terminal 10. Therefore, the file and sensor information transmitted from each sub-terminal 10 may be received by the main terminal 10. Subsequently, in S505, the CPU 11 of the sub-terminal 10 may transmit the file request and the received IP address to another sub-terminal 10 via the short-range communication device 26 (S505). Thereafter, in S506, the CPU 11 may set the transmission completion flag to on (S506) and end the sub-terminal process. In S503, in response to determining that the transmission completion flag has been set to on (YES in S503), the CPU 11 may return to S501. As described above, the transmission completion flag may be changed to "on" in S506. Therefore, although the sub-terminal 10 may receive a file request several times via the short-range communication device 26, the file transmission may be limited to only one time. Thus, this configuration may avoid duplication of the file from a single sub-terminal 10 in a merged file. The transmission completion flag that may be set to on in S506 may be preferably changed to off when the application 14c subsequently restarts. Further, S505 may be omitted if there are no other sub-terminals 10 within a communicable distance for short-range communication.

According to particular configurations, once a plurality of mobile terminals 10 are arranged in line, a plurality of files provided by the respective mobile terminals 10 may be merged in the order according to the positional relationship among the mobile terminals 10. Therefore, for example, a scanning operation of voluminous documents may be readily completed in the following manner. Initially, for example, the voluminous documents may be divided up and scanned by a plurality of mobile terminals 10. Subsequently, the device control application 14b may be started on the plurality of mobile terminals 10, each of which may store a portion of the scanned voluminous documents. Thereafter, the mobile terminals 10 may be disposed in line in an appropriate order to merge the scanned data of the respective mobile terminals 10 into combined data. By doing so, the scanning operation of voluminous documents may be readily completed. Particularly, the file merge conditions (e.g., one or more of the file order, the page order of a received file, and the up/down orientation of pages of each file) may be determined in accordance with the location, the facing direction, and the up/down orientation detected by the respective sensors 23, 24, and 25 of each mobile terminal 10. Therefore, advance setting of the file merge conditions or modification after merging may be avoided. Thus, particular configurations may offer convenience, and the merging of the plurality of files may be intuitive. Further, the transmission and reception of the files may be performed via wireless communication. Therefore, a relatively larger-size file may be transmitted and received speedily thereamong the plurality of mobile terminals 10. Thus, particular configurations may offer convenience when a plurality of files are merged.

Figure 6:
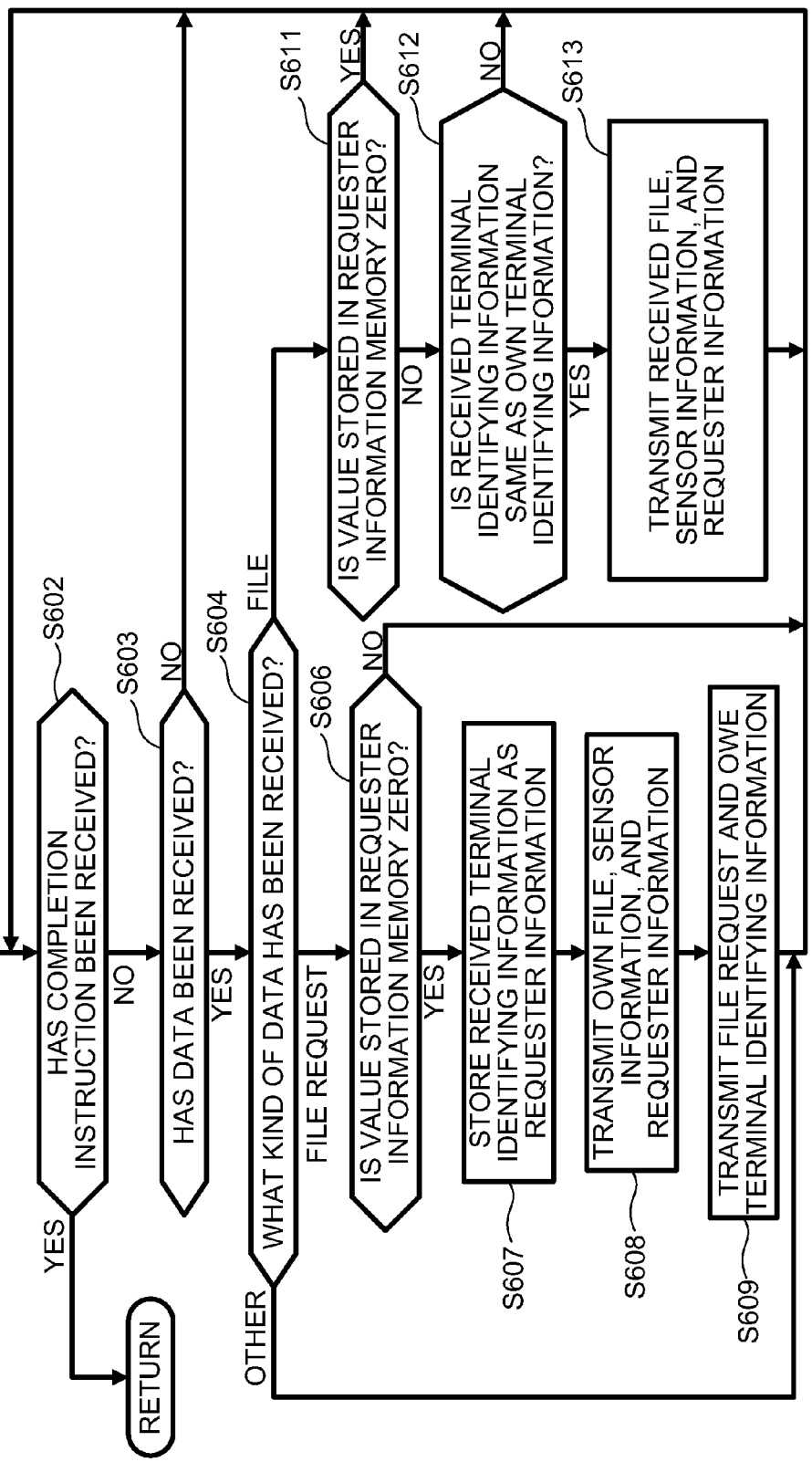
FIG. 6 is a flowchart showing an example sub-terminal process according to certain configurations.
Figure 7:
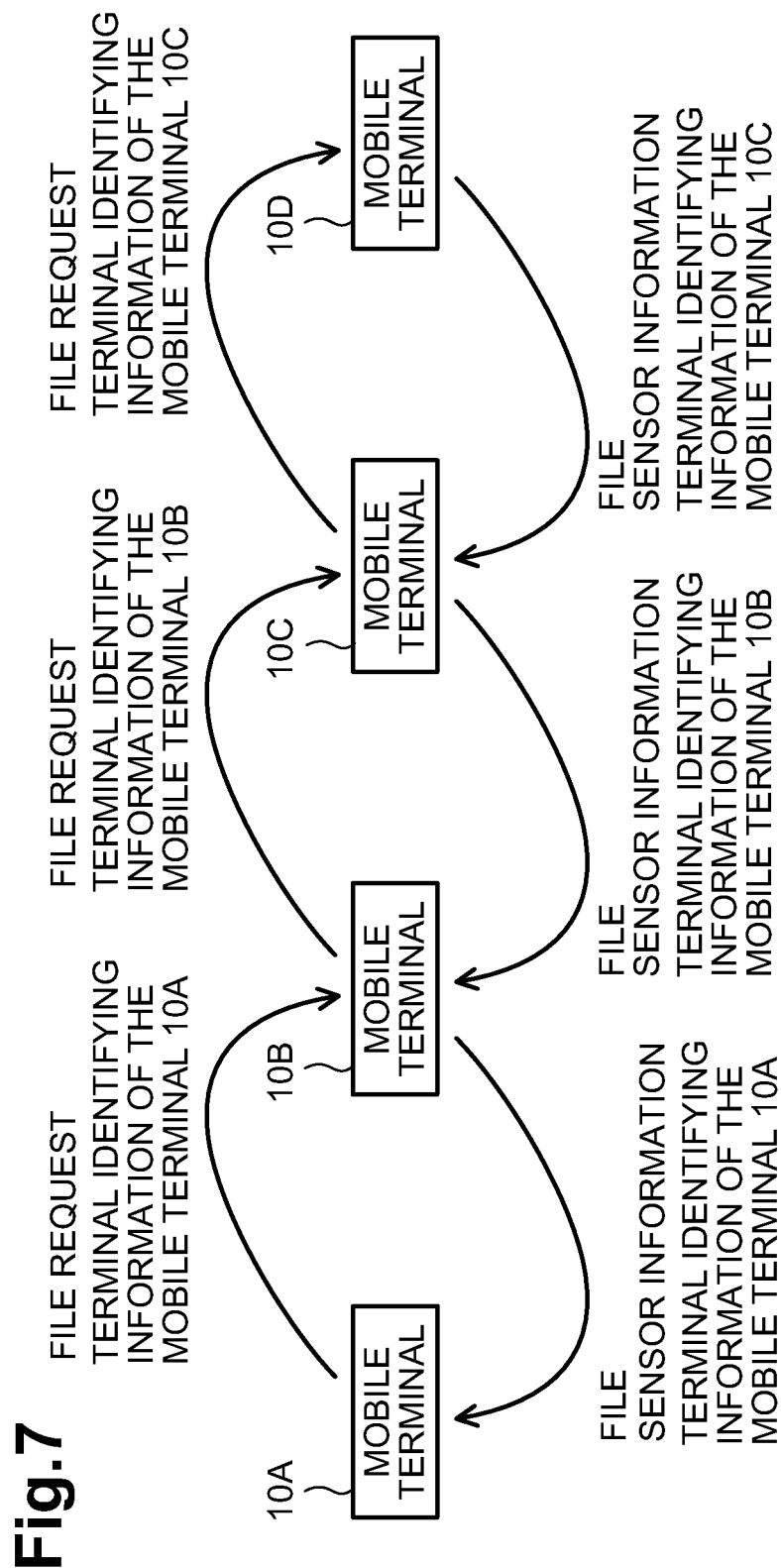
FIG. 7 is a schematic diagram showing a communication performed by each mobile terminal when executing the file merger application according to certain configurations.

Next, with reference to FIGS. 6 and 7, certain configurations according to the one or more aspects of the disclosure are described. In particular configurations described above, the transmission and reception of files among the main terminal 10 and the sub-terminals 10 may be performed via wireless communication using the IP address. Alternatively or additionally, in certain configurations, the transmission and reception of files among the main terminal 10 and the sub-terminals 10 may be performed via short-range communication. Parts that may be different from those described with respect to particular configurations above now are described with respect to certain configurations, and common parts may be identified with the same reference numerals assigned above, such that further description of common parts may be omitted.

In certain configurations, a main-terminal process S302 may be performed, in accordance with the application 14a, by the CPU 11 of the main terminal 10 in a same manner as the main-terminal process of FIG. 3B; however, the file reception may be performed through short-range communication via the short-range communication device 26. Therefore, the "wireless LAN communication device 15" in the main-terminal process of particular configurations may be replaced with the "short-range communication device 26" in the main-terminal process of certain configurations. In certain configurations, terminal identifying information assigned specifically to respective mobile terminals 10 may be used as the identifying information for identifying the mobile terminals 10, respectively, rather than an IP address. A node name may be used as the terminal identifying information, for example. Therefore, in S322 of the main-terminal process shown in FIG. 3B, the CPU 11 of a particular mobile terminal 10 may transmit terminal identifying information identifying the particular mobile terminal 10 as the identifying information, rather than an IP address of a main terminal 10.

With reference to FIG. 6, a sub-terminal process (S303) according to particular configurations now is described. The sub-terminal process may be performed by the CPU 11 of a sub-terminal 10 in accordance with the application 14c. When the sub-terminal process starts, in S602, the CPU 11 may determine whether a completion instruction has been instructed (S602). The determination in S602 may be performed in a similar manner to the determination in S501. In response to determining that a completion instruction has been instructed (YES in S602), the CPU 11 may return to the main process. In response to determining that a completion instruction has not been instructed, the CPU 11 may proceed to S603 and determine whether data has been received via short-range communication (S603). In response to determining that data has not been received via the short-range communication device 26 (NO in S603), the CPU 11 may repeat the determinations in S602 and S603 until a completion instruction is received or data is received via the short-range communication device 26.

In response to determining that data has been received via the short-range communication device 26 (YES in S603), the CPU 11 may proceed to S604 and determine what kind of data (e.g., a file, a file request, or other data) has been received (S604). In response to determining that the received data is data other than a file request and a file and sensor information (OTHER in S604), the CPU 11 may return to S602. In response to determining that the received data is a file request (FILE REQUEST in S604), the CPU 11 may proceed to S606 and determine whether the value stored in a requester information memory provided in the transmission information storage area 13c is a predetermined value, such as, for example, 0 (zero) (S606). The requester information memory may be configured to store therein terminal identifying information received by the sub-terminal 10, as requester information. The requester information memory may be cleared when the application 14c starts. When the sub-terminal 10 initially receives terminal identifying information, the received terminal identifying information may be stored therein as the requester information.

In S606, in response to determining that the value stored in the requester information memory is 0 (zero) (e.g., terminal identifying information has not been stored in the requester information memory) (YES in S606), the CPU 11 may proceed to S607 and store the received terminal identifying information in the requester information memory as the requester information (S607). Subsequently, the CPU 11 may proceed to S608 and transmit the requested file as a merge target in S300, its own sensor information detected by the sensors 23, 24, and 25, and the requester information stored in the requester information memory, via the short-range communication device 26 (S608). According to the processing in S608, the merge-target file and sensor information of the sub-terminal 10 may be transmitted with the addition of the requester information (e.g., the terminal identifying information of the mobile terminal 10 that may be the sender of the file request initially received by the sub-terminal 10). In S609, the CPU 11 may transmit the file request and its own terminal identifying information via the short-range communication device 26 (S609) and return to S602. In S606, in response to determining that the value stored in the requester information memory is not 0 (zero) (e.g., the terminal identifying information has already been stored in the requester information memory) (NO in S606), the CPU 11 may omit S607-S609 and return to S602. According to the processing of S606-S609, the sub-terminal 10 may transmit its own file and sensor information only in response to initially receiving the terminal identifying information.

In response to determining that the data received via the short-range communication device 26 comprises a file and sensor information (FILE in S604), the CPU 11 may proceed to S611 and determine whether the value stored in the requester information memory is a predetermined value, such as, for example, 0 (zero) (S611). In S611, in response to determining that the value stored in the requester information memory is not 0 (zero) (NO in S611), the CPU 11 may proceed to S612 and determine whether the received terminal identifying information is the same as its own terminal identifying information (S612). In S612, in response to determining that the received terminal identifying information is the same as its own terminal identifying information (YES in S612), the CPU 11 may proceed to S613 and transmit the received file, the received sensor information, and the terminal identifying information (e.g., the requester information) stored in the requester information memory, via the short-range communication device 26 (S613) and return to S602. According to S613, the received file and sensor information may be transferred with the terminal identifying information stored as the requester information (e.g., the terminal identifying information of the mobile terminal 10 that may be the sender of the file request initially-received by the sub-terminal 10).

In response to determining that the value stored in the requester information memory is 0 (zero) in S611 (YES in S611) or in response to determining that the received terminal identifying information is not the same as its own terminal identifying information in S612 (NO in S612), the CPU 11 may omit S613 and return to S602. According to S611-S613, a particular sub-terminal 10 may transfer only the file and sensor information to which the own terminal identifying information of the particular sub-terminal 10 is added. As described above, the terminal information added to the file and sensor information in S608 and S613 may be the terminal identifying information of another mobile terminal 10 that may be the sender of the file request initially-received by the sub-terminal 10. Thus, in S611-S613, the sub-terminal 10 may transfer only the file and sensor information received from the other mobile terminal 10 that stores the terminal identifying information of the sub-terminal 10 as the requester information.

With reference to FIG. 7, communication performed by each mobile terminal 10 in accordance with the application 14c in certain configurations now is described. FIG. 7 shows communication performed by the mobile terminals 10 arranged as shown in FIG. 2A. In this example the mobile terminal 10A may function as the main terminal and the mobile terminals 10B, 10C, and 10D may function as the sub-terminals. Nevertheless, in other configurations, others of the mobile terminals 10A, 10B, 10C, and 10D may function as the main terminal or sub-terminals. The mobile terminal 10A functioning as the main terminal 10 may transmit a file request and its own terminal identifying information via short-range communication. The file request and terminal identifying information transmitted by the mobile terminal 10A may be received by a mobile terminal 10 present within the communicable range of short-range communication (e.g., the mobile terminal 10B disposed adjacent to the mobile terminal 10A).

In response to receiving the file request and terminal identifying information from the mobile terminal 10A, the mobile terminal 10B may store the received terminal identifying information in the requester information memory as the requester information. Further, the mobile terminal 10B may transmit the file request and its own terminal identifying information, via short-range communication. The file request and terminal identifying information transmitted by the mobile terminal 10B may be received by, for example, the mobile terminal 10C disposed adjacent to the mobile terminal 10B. Similarly, when the mobile terminals 10C and 10D receive the file request and terminal identifying information from the mobile terminals 10B and 10C, respectively, the mobile terminals 10C and 10D may store the received terminal identifying information in the respective requester information memories as the requester information. Further, each of the mobile terminals 10C and 10D may transmit the file request and its own terminal identifying information, via short-range communication. The file request and terminal identifying information transmitted by the mobile terminal 10B may be received by, for example, the mobile terminal 10C. In some configurations, the processing in accordance with each particular file request and particular terminal identifying information may be limited to one performance for each particular file request. Consequently, the file request and terminal identifying information transmitted by the mobile terminal 10D may not have effect on the other mobile terminals 10 that have already performed the processing in accordance with the file request and terminal identifying information.

In response to receiving the file request and terminal identifying information from the mobile terminal 10C, the mobile terminal 10D may transmit its own file and sensor information using the terminal identifying information of the mobile terminal 10C that sent the requester information to the mobile terminal 10D. The mobile terminal 10C may transmit the file and sensor information, which has been received from the mobile terminal 10D using the terminal identifying information of the mobile terminal 10C, using the terminal identifying information of the mobile terminal 10B that sent the requester information to the mobile terminal 10C. Similarly, mobile terminal 10B may transmit the file and sensor information, which has been received from the mobile terminal 10C using the terminal identifying information of the mobile terminal 10B, using the terminal identifying information of the mobile terminal 10A that sent the requester information to the mobile terminal 10B. Consequently, in certain configurations, the file and sensor information of the mobile terminal 10D may be received by the mobile terminal 10A functioning as the main terminal 10.

Further, in response to receiving the file request and terminal identifying information from the mobile terminal 10B, the mobile terminal 10C may transmit its own file and sensor information using the terminal identifying information of the mobile terminal 10B that sent the requester information to the mobile terminal 10C. In response to receiving the file and sensor information using the terminal identifying information of the mobile terminal 10B, the mobile terminal 10B may transmit the received file and sensor information using the terminal identifying information of the mobile terminal 10A that sent the requester information to the mobile terminal 10B. Consequently, in certain configurations, the file and sensor information of the mobile terminal 10C may be received by the mobile terminal 10A. Similarly, in response to receiving the file request and terminal identifying information from the mobile terminal 10A, the mobile terminal 10B may transmit its own file and sensor information using the terminal identifying information of the mobile terminal 10A that sent the requester information to the mobile terminal 10B. Consequently, in certain configurations, the file and sensor information of the mobile terminal 10B may be received by the mobile terminal 10A.

Thus, each of the files transmitted from the sub-terminals 10 (e.g., the mobile terminals 10B, 10C, and 10D) may be compiled in the main terminal 10 (e.g., the mobile terminal 10A). Further, the main terminal 10 may receive the sensor information transmitted from each sub-terminal 10. The main terminal 10 may determine file merge conditions in accordance with the sensor information received from each sub-terminal 10 and its own sensor information detected by its own sensors 23, 24, and 25, and the main terminal 10 may merge together the files received from the respective sub-terminals 10 and a file provided by the main terminal 10 itself.

According to certain configurations, similar to particular configurations described above, files provided by the respective mobile terminals 10 may be merged in an order according to the positional relationship among the mobile terminals 10 arranged in a line or substantially linear pattern. Further, the communications performed for the file merge may be implemented via short-range communication.

While the disclosure has been described in detail with reference to example configurations, such configurations may merely be examples, and various changes, arrangements and modifications may be applied herein without departing from the spirit and scope of the disclosure.

For example, in above-described configurations, the mobile terminal 10 (e.g., the mobile terminals 10A, 10B, 10C, and 10D), which may comprise a telephone communication function, may be shown as a mobile terminal on which the file merger application 14c (the application 14c) may be installed. Nevertheless, in other configurations, for example, other devices, such as, for example, one or more of a tablet and a digital camera that may not comprise the telephone communication function may be an example of the mobile terminal when such device is enabled to perform at least short-range communication. Further, the disclosure may contemplate other devices that may not comprise the touch-sensitive screen 17, but rather may receive an input mechanical keys or a signal. In above-described configurations, the OS 14a may be the Android™ OS. Nevertheless, in other configurations, the disclosure may be applied to a mobile terminal using another OS.

In above-described configurations, in S402 of the merger process shown in FIG. 4, the merge-target files may be sorted in the arrangement order of the mobile terminals 10 in accordance with the location information of each mobile terminal 10 stored in the file information table 13a. Nevertheless, in other configurations, for example, the processing of S402 may be omitted from the merger process. Consequently, the merge-target files may be merged in a received order of the merge-target files. In above-described configurations, the sub-terminals 10 disposed farther from the main terminal 10 may receive a file request later in time and may transmit a file later in time. Therefore, the main terminal 10 may receive files from the respective sub-terminals 10 in order of decreasing proximity to the main terminal 10. Thus, sorting the files received by the main terminal 10 from the respective sub-terminals 10 in accordance with the location information may be avoided. Accordingly, when the main terminal 10 merges the merge-target files in the file received order, the same effect as that described above may occur. Nevertheless, when the transmission and reception of the files are performed via short-range communication, the file request transmitted by the mobile terminal 10A may be received by not only the mobile terminal 10B but also another mobile terminal 10 (e.g., the mobile terminal 10C). Therefore, the files received by the main terminal 10 may be appropriately sorted in accordance with the location information as described above.

In above-described configurations, the data (e.g., the file request) transmitted by a mobile terminal 10 via short-range communication may be received by another mobile terminal 10 disposed adjacent to the mobile terminal 10. Nevertheless, in other configurations, for example, the data transmitted by the mobile terminal 10 via short-range communication may be received by still another mobile terminal 10 other than the other mobile terminal 10 disposed adjacent to the one mobile terminal 10. In above-described configurations, for example, each sub-terminal 10 may transmit its own file in response to the file request only once. Accordingly, even when a plurality of sub-terminals 10 receive a file request, the main terminal 10 may not receive the same file in duplicate. In certain configurations, the identifying information of the sender of the initially-received file request may be stored as the requester information. Therefore, even when a plurality of sub-terminals 10 receives a file request, file transfers from each sub-terminal 10 to the main terminal 10 may be performed without problems.

In above-described configurations, the main terminal 10 may be configured to merge the files received from the respective sub-terminals 10 and the file provided by the main terminal 10 itself. Nevertheless, in other configurations, for example, the main terminal 10 may be configured to merge files received from the respective sub-terminals 10 only without merging a ile provided by the main terminal 10 itself. In this case, the main terminal 10 may be configured to function as a terminal dedicated to merge files received from the respective sub-terminals 10.

In above-described configurations, the mobile terminal 10 at the front of the line of the plurality of mobile terminals 10 may be assigned as the main terminal 10. Nevertheless, in other configurations, for example, the main terminal 10 may not be at the front of the line but rather may be in the middle of the line or elsewhere in the line. In this case, the CPU 11 of the main terminal 10 may determine which one of the mobile terminals present at the line ends is assigned as the front of the line in various manners. For example, a screen that may allow the selection of one of the mobile terminals 10 at the line ends as the front of the line may be displayed on the LCD 18. With this configuration, a selection may be accepted through the touch-sensitive screen 17. In another case, a mobile terminal 10 at a line end located relatively closer to the main terminal 10 than one or more other mobile terminals 10 at the line end or another line end may be assigned as the front of the line. A resultant order of the files comprising the merged file in such other configurations may be readily apparent based on the foregoing discussion of above-described configurations, and further discussion thereof is omitted. Nevertheless, in other configurations, for example, the order of the files constituting the merged file may be sorted in a reverse order when a predetermined operation (e.g., a tap of a predetermined soft key disposed on the LCD 18) is inputted.

In above-described configurations, the main terminal 10 may be configured to disable the reception of files after the last received time. Nevertheless, in other configurations, for example, the number of sub-terminals 10 may be inputted into the main terminal 10 in advance. The main terminal 10 may be configured to disable the reception of a file when the main terminal 10 receives a number of files that may be equal to the inputted number of sub-terminals 10. In above-described configurations, in the main-terminal process of FIG. 3B, the mobile terminal 10 may be configured to obtain its own sensor information before transmitting a file request. Nevertheless, in other configurations, for example, the mobile terminal 10 may be configured to its obtain own sensor information at an appropriate timing between when the main-terminal process starts and when the merger process starts.

In above-described configurations, the mobile terminal 10 may comprise the LCD 18 on the one surface, wherein the surface on which the LCD 18 may be disposed may be referred to as the reference surface and the other surface that may be opposite to the reference surface may be referred to as the rear surface (e.g., the rear surface 101a). A mobile terminal comprising the LCDs 18 on both surfaces thereof or having a complicated shape may be contemplated herein, wherein a predetermined surface may be referred to as the reference surface and an opposite surface to the reference surface may be referred to as the rear surface. In above-described configurations, the mobile terminal 10 may comprise the LCD 18 on the one surface thereof and the reference surface may refer to the surface on which the LCD 18 may be disposed. Nevertheless, in other configurations, for example, a predetermined surface other than a surface on which the LCD 18 may be disposed may be referred to as the reference surface in such a mobile device.

In above-described configurations, the up/down orientation of each mobile terminal 10 may correspond to the direction of gravity Nevertheless, in other configurations, for example, the up/down orientation of a main body of one of a plurality mobile terminals 10 may be predetermined. Accordingly, the up/down orientation of the other mobile terminals 10 may be determined relative to the up/down orientation of the one reference mobile terminal. For example, the up/down orientation of the main body of the mobile terminal 10 may be determined with respect to the longitudinal direction of the surface on which the LCD 18 may be disposed, wherein the side on which the LCD 18 may be disposed may be defined as a top of the main body of the mobile terminal 10 and the side on which the operation key 16 may be disposed may be defined as the bottom of the main body of the mobile terminal 10. In this case, when the up/down orientation of the sub-terminal 10 is inverted with reference to the up/down orientation of the main terminal 10, each page of the second file may be inverted. In such configurations, the disclosure may be applied to this variation even when the two mobile terminals 10 are brought closer to each other while their surfaces having the LCD 18 thereon are maintained in a horizontal position.

In above-described configurations, the merge-target files may be in the same format. Nevertheless, in other embodiments, for example, the merge-target files may be in respective different formats. In this case, the disclosure may be applied to the mobile terminal that may comprise a mechanism for converting the file format. In above-described configurations, the merge-target files provided by the sub-terminals 10 and the main terminal 10 may be stored in the memory card 20. Nevertheless, in other configurations, for example, the merge-target files may be stored in a memory built in the mobile terminal 10, such as the flash memory 14. Further, in certain configurations, the terminal identifying information may be used as the identifying information. Nevertheless, in other configurations, for example, the IP address used in particular configurations or a MAC address may be used as the identifying information. The values referred to in above-described configurations may be merely examples. As a matter of course, other values may be adopted thereto.

While the invention has been described in connection with various exemplary structures and illustrative configurations, it will be understood by those skilled in the art that other variations and modifications of the structures, configurations, and configurations disclosed above may be made without departing from the scope of the invention. For example, this application comprises each and every possible combination of the various elements and features disclosed herein, and the particular elements and features presented in the claims and disclosed above may be combined with each other in other ways within the scope of the application, such that the application should be recognized as also directed to other configurations comprising other possible combinations. Other structures, configurations, and configurations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A non-transitory computer-readable storage medium storing computer-readable instructions therein, the computer-readable instructions, when executed by an information processing device configured to communicate with a plurality of terminal devices, instructing the information processing device to perform steps comprising:
   transmitting a request comprising identifying information, the identifying information identifying the information processing device;
   receiving a first file and first location information from a first terminal device of the plurality of terminal devices, the first location information representing a location of the first terminal device;
   receiving a second file and second location information from a second terminal device of the plurality of terminal devices, the second location information representing a location of the second terminal device;
   determining a positional relationship between the first terminal device and the second terminal device based on the first location information and the second location information;
   determining a file merger order of the first file and the second file based on the positional relationship between the first terminal device and the second terminal device; and
   merging the first file and the second file into a single file wherein content of the first file and content of the second file is arranged based on the file merger order.

2. The non-transitory computer-readable storage medium according to claim 1,
  wherein the step of receiving the first file and the first location information comprises:
    receiving the first location information generated by a first location sensor, the first terminal device comprising the first location sensor; and
    receiving the first file from a storage device, the first terminal device comprising the storage device, and
  wherein the step of receiving the second file and the second location information comprises:
    receiving the second location information generated by a second location sensor, the second terminal device comprising the second location sensor.

3. The non-transitory computer-readable storage medium according to claim 1, wherein the first terminal device comprises the information processing device.

4. The non-transitory computer-readable storage medium according to claim 1,
  wherein the computer-readable instructions further instruct the information processing device to perform steps comprising:
    receiving first orientation information generated by a first orientation sensor, the first orientation information representing an operational orientation of the first terminal device, and the first terminal device comprising the first orientation sensor;
    receiving second orientation information generated by a second orientation sensor, the second orientation information representing an operational orientation of the second terminal device, the second terminal device comprising the second orientation sensor;
    determining whether the operational orientation of the first terminal device is a substantially normal orientation;
    determining whether the operational orientation of the second terminal device is the substantially normal orientation;
    changing a page orientation of at least one page of the first file into a particular orientation in response to determining that the operational orientation of the first terminal device is not the substantially normal orientation;
    changing a page orientation of at least one page of the second file into the particular orientation in response to determining that the operational orientation of the second terminal device is not the substantially normal orientation, and
  wherein the step of merging the first file and the second file comprises:
    merging the at least one page of the first file and the at least one page of the second file subsequent to at least one of the step of changing the page orientation of the at least one page of the first file and the step of changing the page orientation of the at least one page of the second file when the information processing device has performed the at least one page of the first file and the step of changing the page orientation of the at least one page of the second file.

5. The non-transitory computer-readable storage medium according to claim 4, wherein merging the at least one page of the first file and the at least one page of the second file comprises:
  merging the at least one page of the first file, the page orientation of which is changed to the particular orientation, and the at least one page of the second file, the page orientation of which is not changed to the particular orientation, when the information processing device has determined that the operational orientation of the first terminal device is not the substantially normal orientation and the operational orientation of the second terminal device is the substantially normal orientation.

6. The non-transitory computer-readable storage medium according to claim 4, wherein merging the at least one page of the first file and the at least one page of the second file comprises:
  merging the at least one page of the first file, the page orientation of which is not changed to the particular orientation, and the at least one page of the second file, the page orientation of which is changed to the particular orientation, when the information processing device has determined that the operational orientation of the first terminal device is the substantially normal orientation and the operational orientation of the second terminal device is not the substantially normal orientation.

7. The non-transitory computer-readable storage medium according to claim 4, wherein merging the at least one page of the first file and the at least one page of the second file comprises:
  merging the at least one page of the first file, the page orientation of which is changed to the particular orientation, and the at least one page of the second file, the page orientation of which is changed to the particular orientation, when the information processing device has determined that the operational orientations of both the first terminal device and the second terminal device are not the substantially normal orientation.

8. The non-transitory computer-readable storage medium according to claim 1,
  wherein the step of transmitting the request comprises:
    transmitting the request, via a short-range communication device using short-range communication, to at least one terminal device of the first terminal device and the second terminal device when a distance between the information processing device and the at least one terminal device is less than or equal to a predetermined distance, the short-range communication device configured to perform the short-range communication over the predetermined distance, and
  wherein at least one of the step of receiving the first file and the first location information and the step of receiving the second file and the second location information comprises:
    receiving, via a wireless communication device using wireless communication, at least one of the first file and the second file from the at least one terminal device that receives the transmitted request.

9. The non-transitory computer-readable storage medium according to claim 1, wherein the computer-readable instructions further instruct the information processing device to perform steps comprising:
  receiving a first file request and particular identifying information from a particular terminal device of the plurality of terminal devices, the particular identifying information identifying the particular terminal device;
  transmitting a second file request in response to receiving the first file request; and
  transmitting a particular response in response to receiving the first file request, the particular response comprising a particular file.

10. The non-transitory computer-readable storage medium according to claim 9, wherein the computer-readable instructions further instruct the information processing device to perform steps comprising:
transmitting the particular identifying information in response to receiving the first file request and the particular identifying information, and
wherein the step of transmitting the particular response comprises:
transmitting the particular response to the particular mobile terminal.

11. The non-transitory computer-readable storage medium according to claim 9,
wherein the step of the receiving the first file request and the particular identifying information comprises:
receiving the first file request and the particular identifying information via a short-range communication device using short-range communication,
wherein the step of transmitting the second file request comprises:
transmitting the second file request via the short-range communication device using the short-range communication, and
wherein the step of transmitting the particular response comprises:
transmitting the particular response to the particular mobile terminal via a wireless communication device using wireless communication.

12. The non-transitory computer-readable storage medium according to claim 9,
wherein the computer-readable instructions further instruct the information processing device to perform steps comprising:
transmitting further identifying information in response to receiving the first file request, the further identifying information identifying the information processing device, and
wherein the particular response transmitted in the step of transmitting the particular response further comprises the particular identifying information.

13. The non-transitory computer-readable storage medium according to claim 12, wherein the computer-readable instructions further instruct the information processing device to perform steps comprising:
storing the particular identifying information in a storage device in response to receiving the particular identifying information, the information processing device comprising the storage device;
receiving another response in response to the second file request, the other response comprising another file, which is stored on another terminal device of the plurality of terminal devices, and other identifying information, and the other identifying information identifying the other terminal device;
determining whether the other identifying information corresponds to the further identifying information; and
transmitting the particular identifying information stored in the storage device with the other file to the particular terminal device if and only if the other identifying information corresponds to the further identifying information.

14. The non-transitory computer-readable storage medium according to claim 9, wherein the computer-readable instructions further instruct the information processing device to perform steps comprising:
storing transmission information representing the transmission of the second file request into a storage device in response to transmitting the second file request, the information processing device comprising the storage device;
determining whether the second file request has been transmitted based on the transmission information stored in the storage device; and
transmitting the second file request in response to determining that the second file request has not been transmitted.

15. The non-transitory computer-readable storage medium according to claim 9, wherein the particular response transmitted in the step of transmitting the particular response further comprises third location information representing a location of the information processing device, the third location information being generated by a location sensor.

16. The non-transitory computer-readable storage medium according to claim 9, wherein the particular response transmitted in the step of transmitting the particular response further comprises direction information representing a direction of the information processing device, the direction information generated by a direction sensor.

17. A non-transitory computer-readable storage medium storing computer-readable instructions therein, the computer-readable instructions, when executed by an information processing device configured to communicate with a plurality of terminal devices, instructing the information processing device to perform steps comprising:
transmitting a request comprising identifying information, the identifying information identifying the information processing device;
receiving a first file and first location information from a first terminal device of the plurality of terminal devices;
receiving a second file and second location information from a second terminal device of the plurality of terminal devices;
determining a positional relationship between the first terminal device and the second terminal device based on the first location information and the second location information;
receiving first direction information generated by a first direction sensor, the first direction information representing a facing direction of the first terminal device, and the first terminal device comprising the first direction sensor;
receiving second direction information generated by a second direction sensor, the second direction information representing a facing direction of the second terminal device, the second terminal device comprising the second direction sensor;
determining a reference direction pointing from the first terminal device toward a region comprising the second terminal device based on the positional relationship between the first terminal device and the second terminal device;
determining whether the facing direction of the first terminal device is substantially the same as the reference direction;
determining whether the facing direction of the second terminal device is substantially the same as the reference direction;
sorting pages of the first file into reverse order in response to determining that the facing direction of the first terminal device is not substantially the same as the reference direction when the first file comprises a plurality of pages;
sorting pages of the second file into reverse order in response to determining that the facing direction of the second terminal device is not substantially the same as the reference direction when the second file comprises a plurality of pages; and merging the pages of the first file and the second file subsequent to at least one of the step of sorting the pages of the first file and the step of sorting the pages of the second file when the information processing device has performed the at least one of the step of sorting the pages of the first file and the step of sorting the pages of the second file.

18. The non-transitory computer-readable storage medium according to claim 17, wherein merging the pages of the first file and the second file comprises:

merging sorted pages of the first file and unsorted pages of the second file when the information processing device has determined that the facing direction of the first terminal device is not substantially the same as the reference direction and the facing direction of the second terminal device is substantially the same as the reference direction.

19. The non-transitory computer-readable storage medium according to claim 17, wherein merging the pages of the first file and the second file comprises:

merging unsorted pages of the first file and sorted pages of the second file when the information processing device has determined that the facing direction of the first terminal device is substantially the same as the reference direction and the facing direction of the second terminal device is not substantially the same as the reference direction.

20. The non-transitory computer-readable storage medium according to claim 17, wherein merging the pages of the first file and the second file comprises:

merging sorted pages of the first file and sorted pages of the second file when the information processing device has determined that both the facing direction of the first terminal device and the facing direction of the second terminal device are not substantially the same as the reference direction.

21. An information processing device configured to communicate with a plurality of terminal devices, the information processing device comprising:

a communication device configured to communicate with at least one of the plurality of terminal devices;

a processor; and a memory storing computer-readable instructions that, when executed by the processor, instruct the information processing device to perform steps comprising:

transmitting a request comprising identifying information, the identifying information identifying the information processing device;

receiving a first file and first location information from a first terminal device of the plurality of terminal devices, the first location information representing a location of the first terminal device;

receiving a second file and second location information from a second terminal device of the plurality of terminal devices, the second location information representing a location of the second terminal device;

determining a positional relationship between the first terminal device and the second terminal device based on the first location information and the second location information;

determining a file merger order of the first file and the second file based on the positional relationship between the first terminal device and the second terminal device; and merging the first file and the second file into a single file wherein content of the first file and content of the second file is arranged based on the file merger order.

22. The information processing device according to claim 21, wherein the computer-readable instructions stored in the memory further instruct the information processing device to perform steps comprising:

receiving a first file request and particular identifying information from a particular terminal device of the plurality of terminal devices, the particular identifying information identifying the particular terminal device;

transmitting a second file request in response to receiving the first file request; and transmitting a particular response in response to receiving the first file request, the particular response comprising a particular file stored in the memory.

* * * * *